United States Patent
An

(10) Patent No.: US 7,082,097 B2
(45) Date of Patent: Jul. 25, 2006

(54) OPTICAL DISC CAPABLE OF ENHANCING THE PERFORMANCE OF DISC DRIVER

(75) Inventor: Jong-tae An, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 10/374,718

(22) Filed: Feb. 27, 2003

(65) Prior Publication Data

US 2003/0179690 A1 Sep. 25, 2003

(30) Foreign Application Priority Data

Feb. 28, 2002 (KR) .................. 10-2002-0010980

(51) Int. Cl.
  *G11B 7/24* (2006.01)
(52) U.S. Cl. .............. 369/275.4; 369/275.1; 428/64.4
(58) Field of Classification Search .......... None
  See application file for complete search history.

(56) References Cited

U.S. PATENT DOCUMENTS

| 5,991,258 | A  | * | 11/1999 | Morita et al. ............ 369/275.4 |
| 6,038,208 | A  | * | 3/2000 | Shikunami et al. ....... 369/275.3 |
| 6,078,559 | A  | * | 6/2000 | Takemura et al. ........ 369/275.3 |
| 6,381,206 | B1 | * | 4/2002 | Maeda ................... 369/59.12 |
| 6,411,593 | B1 | * | 6/2002 | Yoon et al. ............. 369/275.4 |
| 6,570,838 | B1 | * | 5/2003 | Jarach .................. 369/275.3 |
| 6,590,717 | B1 | * | 7/2003 | Sasano et al. ......... 369/112.23 |
| 6,590,857 | B1 | * | 7/2003 | Ohkubo et al. ......... 369/275.4 |
| 6,757,227 | B1 | * | 6/2004 | Kumagai et al. ........ 369/44.37 |
| 6,841,049 | B1 | * | 1/2005 | Ito et al. .............. 204/298.15 |
| 6,866,909 | B1 | * | 3/2005 | Wisnudel et al. .......... 428/64.1 |
| 2002/0110067 | A1 | * | 8/2002 | Kondo et al. ............ 369/275.4 |

* cited by examiner

*Primary Examiner*—Tan Dinh
(74) *Attorney, Agent, or Firm*—Staas & Halsey LLP

(57) ABSTRACT

A disc which insures a normal performance of an optical disc driver (ODD) and a method of manufacturing the same by accounting for disc defects. A reflectivity of the disc is within a range of 45–70% and a birefringence of the disc is within a range of 100–150 nm. Since the acquisition and manufacture of marginal discs which account for defect factors are possible, the influence of the defect factors can be continuously limited. Thus, a predetermined quality of discs can be used in the ODD.

20 Claims, 25 Drawing Sheets

Fourth Type

Fourth Type

Sixth Type

Sixth Type

Eighth Type

Eighth Type

Ninth Type

Ninth Type

Eleventh Type

Eleventh Type

Eleventh Type

Eleventh Type

Twelfth Type

Twelfth Type

OPTICAL DISC CAPABLE OF ENHANCING THE PERFORMANCE OF DISC DRIVER

CROSS-REFERENCE TO RELATED APPLICATIONS

This application claims the benefit of Korean Patent Application No. 2002-10980, filed Feb. 28, 2002, in the Korean Intellectual Property Office, the disclosure of which is incorporated herein by reference.

BACKGROUND OF THE INVENTION

1. Field of the Invention

The present invention relates to a disc which insures a normal performance of an optical disc driver (ODD) by accounting for disc defects and a method of manufacturing the same, and more particularly, to a disc that is manufactured by quantifying defect factors affecting the ODD so as to insure the recording/reproducing capacity of the ODD and a method of manufacturing the same.

2. Description of the Related Art

The number of disc manufacturers has reached to hundreds throughout the world. Normally, each disc manufacturer follows general specifications based on disc standards and manufactures discs satisfying specific specifications which guarantee the quality of the discs. However, manufactured discs deviate from the specific specifications due to several factors, such as wear of a stamper used in a manufacturing of the discs, frequency of dye changes, and an injection temperature of the discs. In this case, an optical disc driver (ODD) will present a constant utilization error, i.e., the ODD does not normally record or read information on or from a disc using a pickup assembly. Therefore, defective discs which deviate from the specification are unavoidable due to problems associated with the manufacturing process. Since these problems directly affect the performances of the ODD, a method is needed to solve these problems.

However, it is very difficult and inefficient to improve the recording/reproducing capacity of an ODD with respect to a defective disc. That is, since the acquisition of a defective disc is possible while the continuous acquisition of the same type of defective disc is impossible, the continuous improvement of the reproducing capacity of an ODD has many limitations.

In addition, although continuous investigations and analyses of the acquired defective disc are needed, difficulties managing the research on this topic may cause secondary defect factors. In other words, when a surface of a disc is scratched, a user's fingerprints remains on the surface of the disc, and while the disc is repeatedly used, secondary defect factors, such as a deviation of an inner circumference of a spin hole, or the like, may additionally occur. Thus, it is difficult to accurately investigate the defect factors.

Furthermore, since frequently occurring defect factors have never been classified into types, an ODD manufacturer cannot but recall and analyze the defective disc and improve the reproducing capacity of the defective disc. Thus, taking comprehensive and systematic steps against defective discs has many limitations.

For the above-described reasons, a process of classifying disc defects into types and making the defective discs which satisfy normalized specifications based on a classified type is needed. Also, the recording/reproducing capacity of the ODD should not be affected when using the defective discs.

However, many disc manufacturers do not closely follow the normalized specification when manufacturing discs based on the formats specified in the orange book (CD-R), red book (CD-DA), and yellow book (CD-ROM). To manufacture defective discs in a predetermined range necessary to not affect the recording/reproduction capacity of the ODD using the defective discs, a stamper is made by considering instrumental characteristics of the defective discs. Here, the instrumental characteristics include an eccentricity, a deviation, a thickness, and a centroid, and are shown in Table 1 below.

TABLE 1

| No | Item | Normalized Spec | Spec of Manufactured Defective Disc | | |
|----|------|-----------------|-------------------------------------|--|--|
| 1 | Eccentricity | 50 μm | 280 μm | | Manufactured |
| 2 | Deviation | 0.3 mm | 1 mm | | confined to |
| 3 | Centroid | No Spec | 1 g | | changes in |
| 4 | Thickness | 1.2 mm | (1.2 + 0.3) mm–(1.2 − 0.1) mm | | physical |
| 5 | Scratch | | 2 mm | Normalized | formats |
| 6 | Fingerprint | | 75 μm | as error | |
| 7 | Dot | | 1 mm | correction capacity | |

To manufacture a disc which satisfies the values presented in Table 1, the following items are changed when manufacturing a stamper. A disc is manufactured according to the eccentricity of the manufacturing specification so as to have the centroid deviate by 280 μm from the standardized value when cutting an inner hole after the stamper is manufactured. In addition, according to the deviation of the manufacturing specification, where the disc rotates, deviation components are created by varying the thickness of the inner hole after the stamper is manufactured. After the stamper is manufactured, scratches, fingerprints, and dots may be added to a surface of the disc.

The ODD may be regarded as having characteristics to account for a defective disc having the above-described instrumental characteristics, where the defective disc is reproduced in the ODD. However, stamper defects which occur during a stamper manufacturing and injection molding errors in the disc cause more problems than physical changes in the defective disc. Nevertheless, accurate and detailed data on defects of discs currently marketed do not exist, and discs manufactured based on defect characteristics are not supplied. Thus, it is difficult to stably and continuously improve the reproducing capacity of the ODD against the defect characteristics.

SUMMARY OF THE INVENTION

Accordingly, it is an aspect of the present invention to provide a disc which improves a recording/reproducing capacity of an ODD by quantifying defect factors that inevitably occur in a disc manufacturing process, and a method of manufacturing the disc accounting for the same.

Additional aspects and/or advantages of the invention will be set forth in part in the description which follows and, in part, will be obvious from the description, or may be learned by practice of the invention.

To achieve the above and/or other aspects of the present invention, there is provided a disc which improves a performance of an optical disc drive, the disc having a reflectivity within a range of 45–70% and a birefringence within a range of 100–150 nm.

The disc may have a symmetry within a range of −20±5.

The disc may have a track pitch within a range of 1.35±0.3 μm.

A push-pull of the disc may be within a range of 0.02±0.005.

A tilting of the disc may be greater than 0.5 degrees.

To achieve the above and/or other aspects of the present invention, there is provided a method of manufacturing a disc to improve a performance of an optical disc drive, the method comprising manufacturing a glass master including forming pits by depositing a photoresist and developing the photoresist on a master, and depositing Ni on the completely developed master, manufacturing a stamper by plating a surface of the glass master with Ni, and injection-molding a transparent substrate at an injection temperature of 68–80° C. by attaching the stamper to a mold. The method further comprises coating a surface of the transparent substrate, on which marks of the transparent substrate are formed, with a reflective layer and coating the reflective layer with a protective layer, wherein the coating of the surface includes adjusting a thickness of the reflective layer so as to have a reflectivity of the disc within a range of 45–70%.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
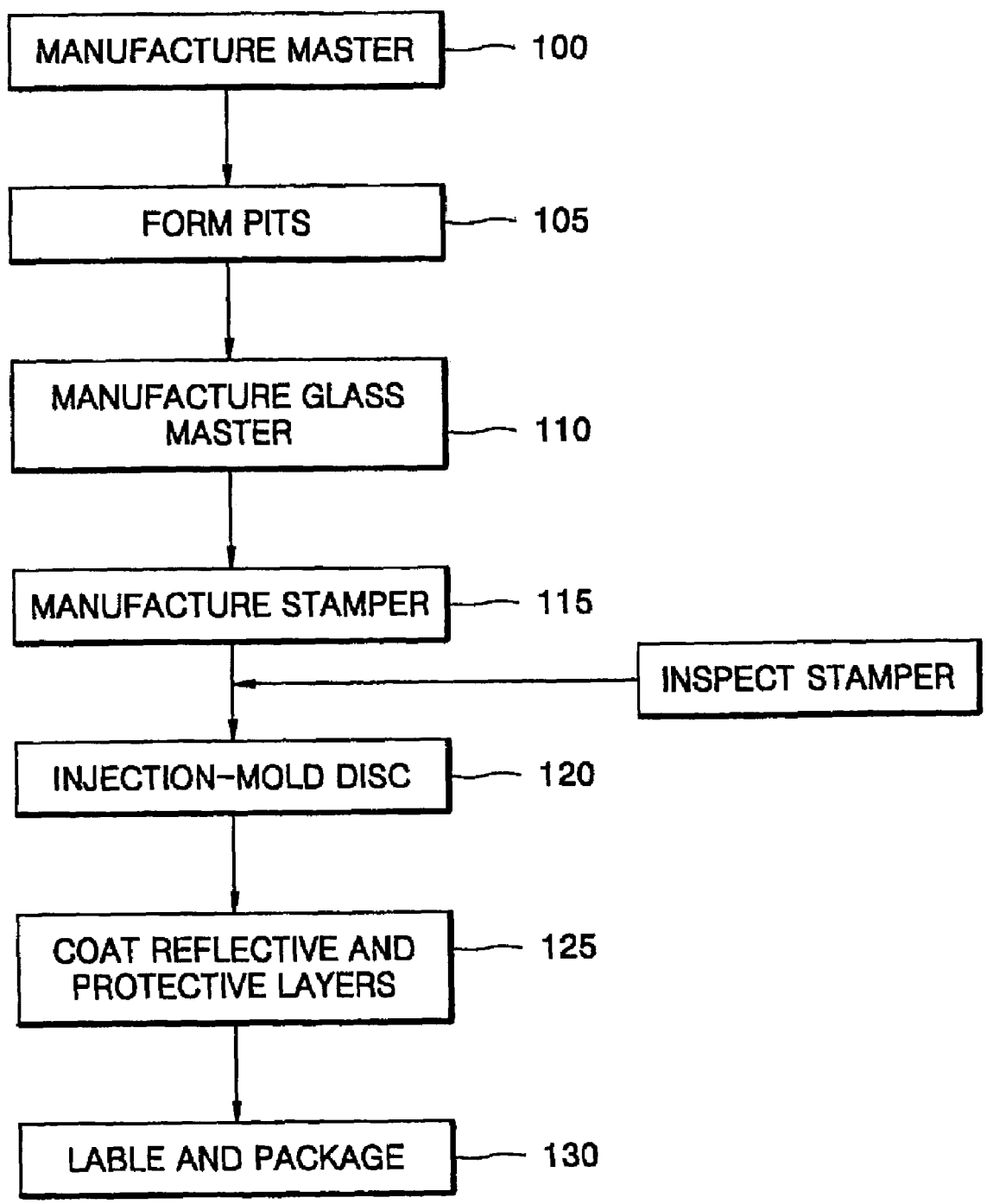
FIG. 1 is a flowchart of a process of manufacturing a general disc.
Figure 2A:
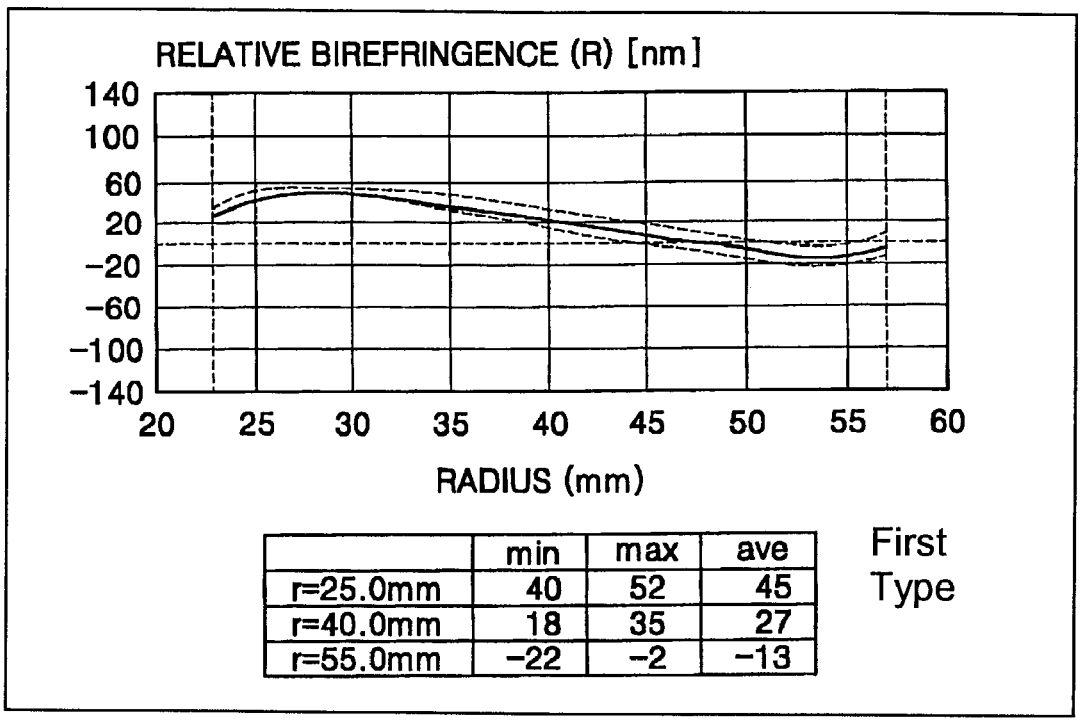
FIG. 2A is a graph illustrating a birefringence with respect to a radius of a first type of disc according to an embodiment of the present invention.
Figure 2B:
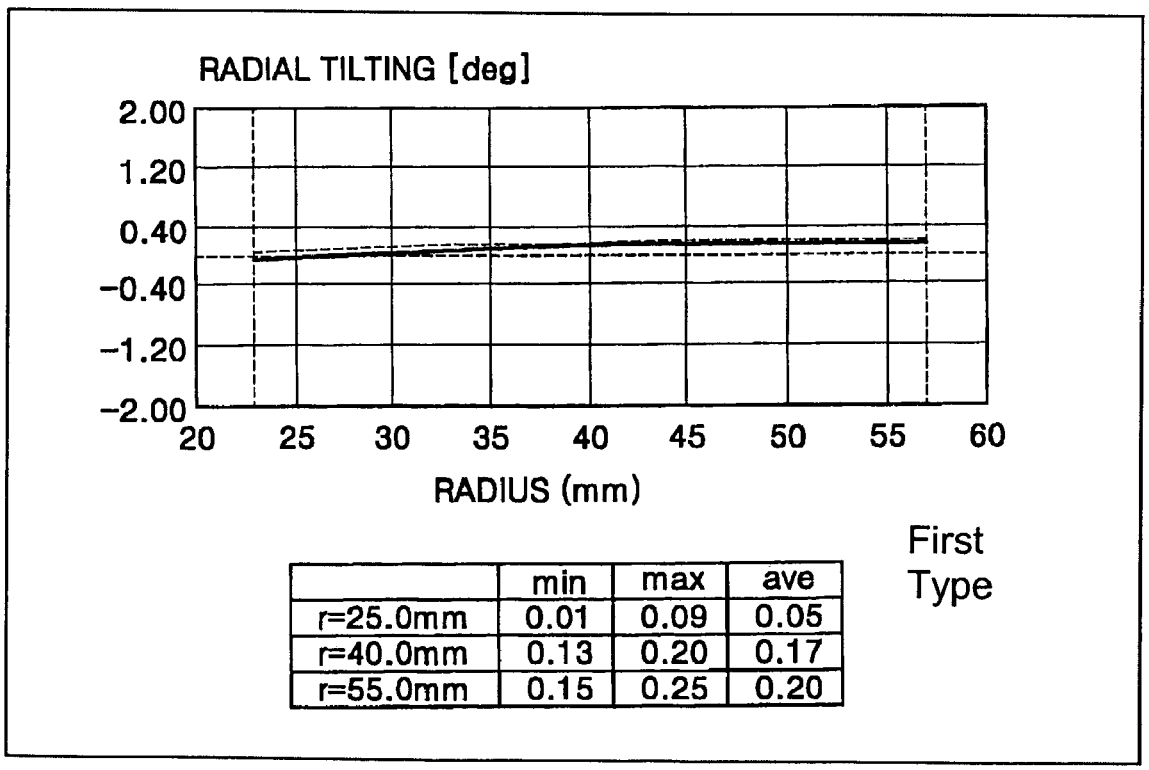
FIGS. 2B through 2D are graphs illustrating a tilting with respect to the radius of the first type of disc according to the present invention.
Figure 2C:
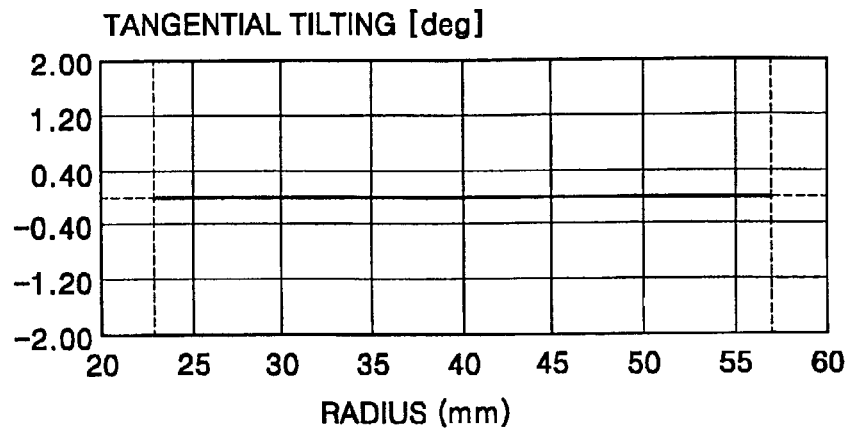
Figure 2D:
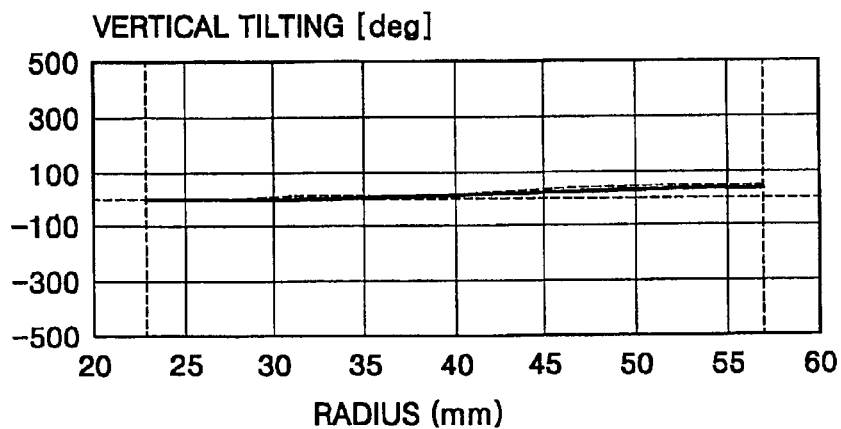
Figure 3A:
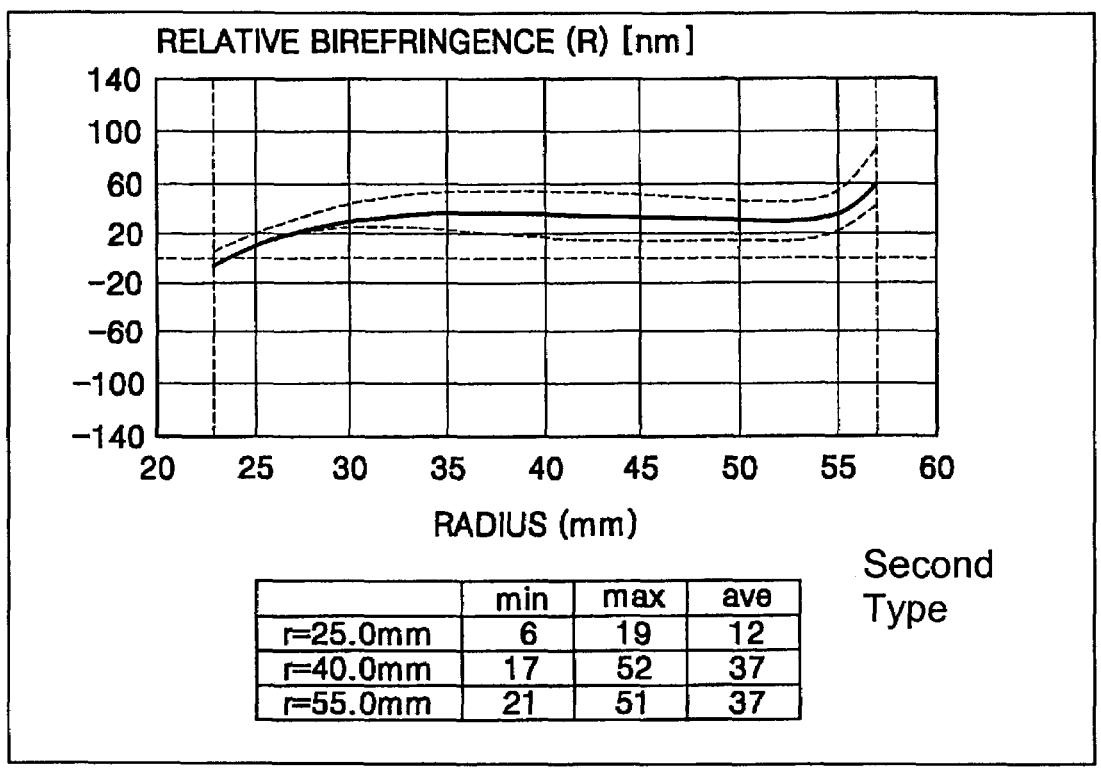
FIGS. 3A through 13D are graphs illustrating a birefringence and tilting with respect to second through twelfth types of discs according to further embodiments of the present invention.
Figure 3B:
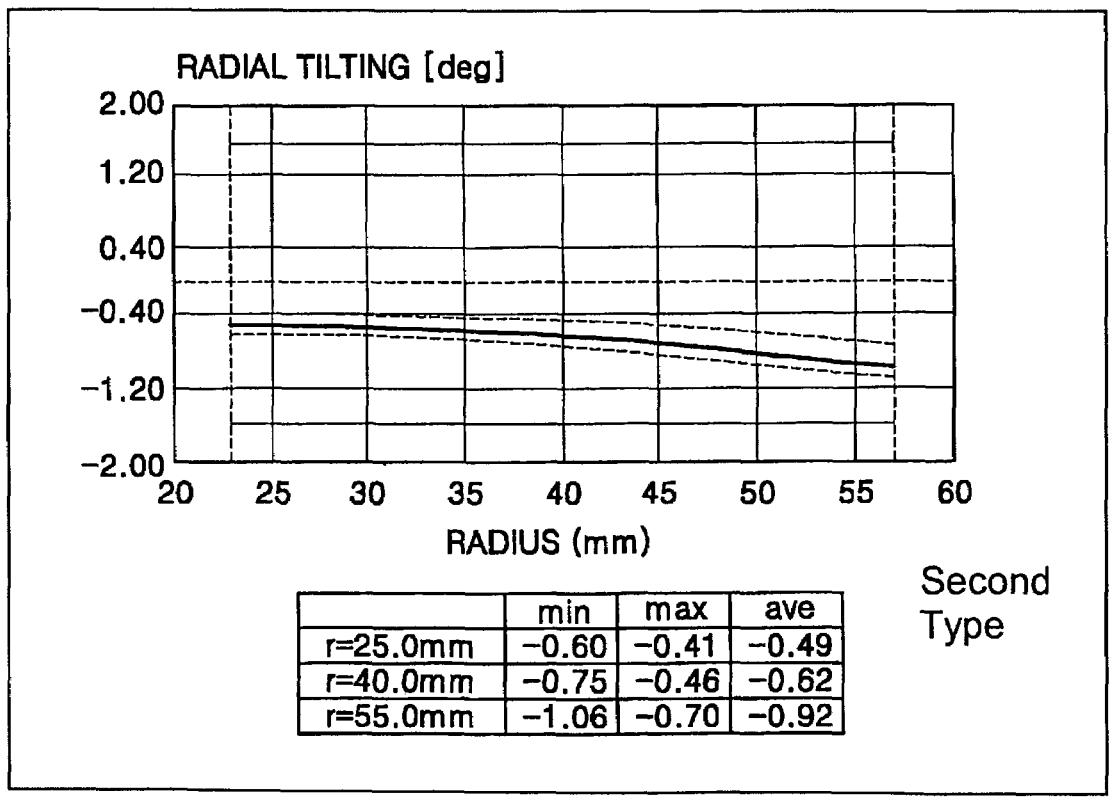
Figure 3C:
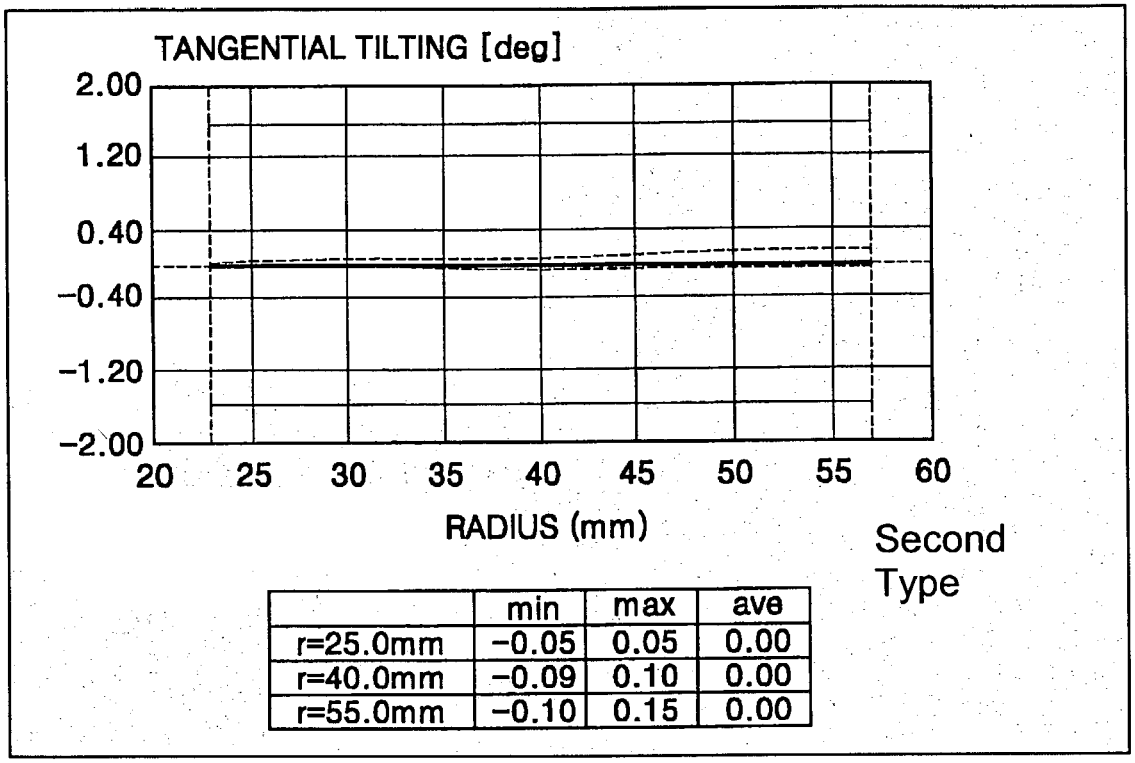
Figure 3D:
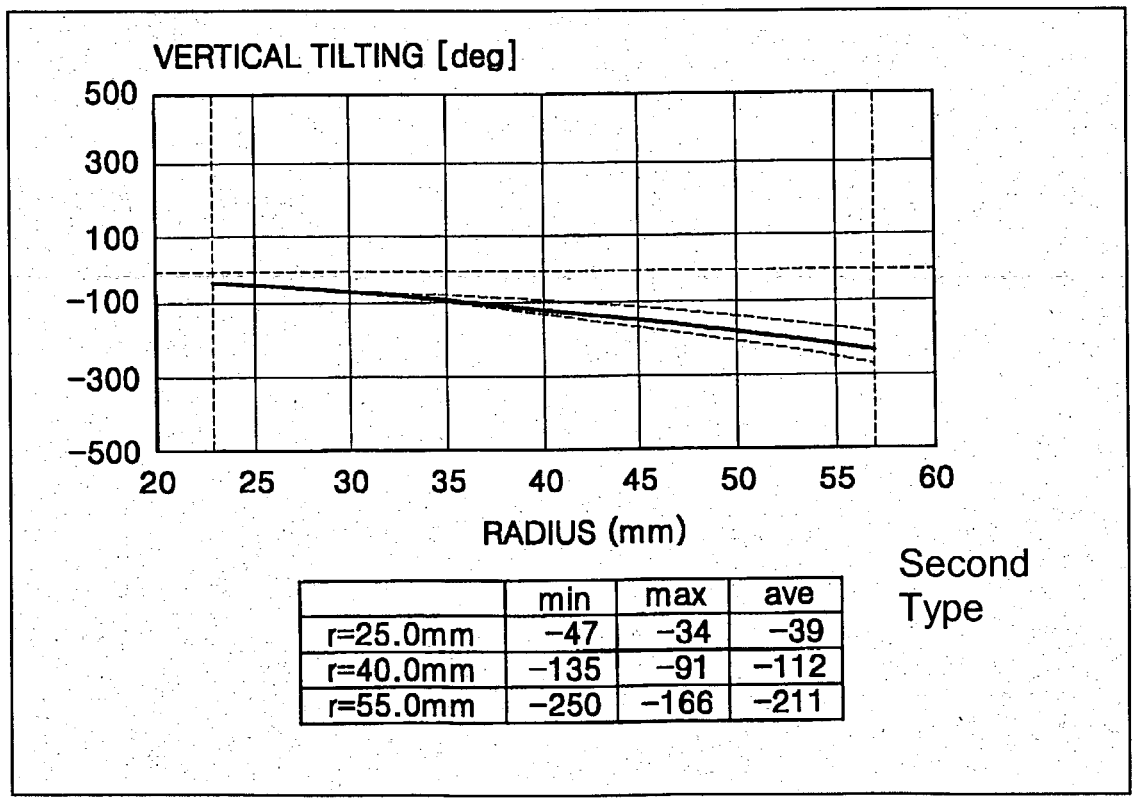
Figure 4A:
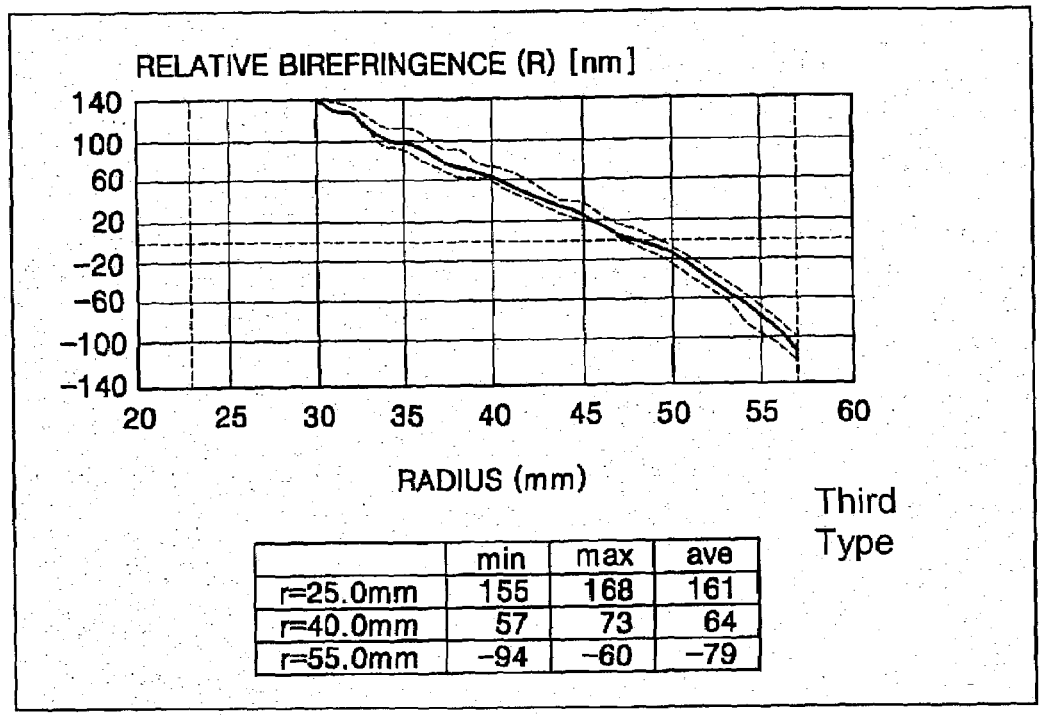
Figure 4B:
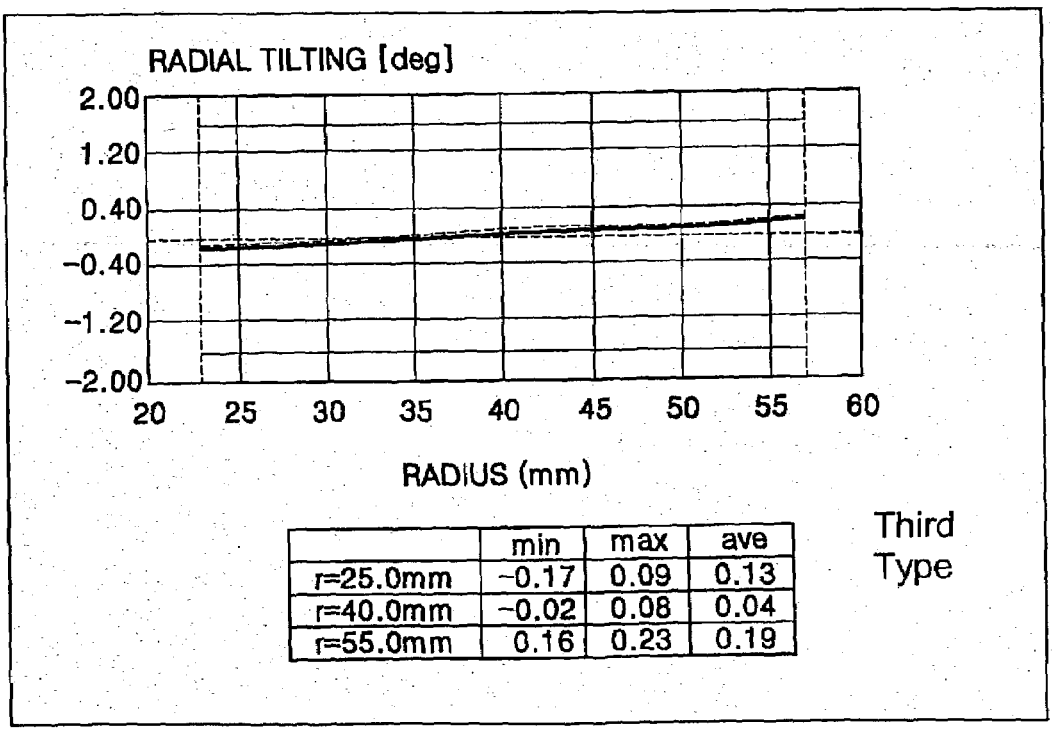
Figure 4C:
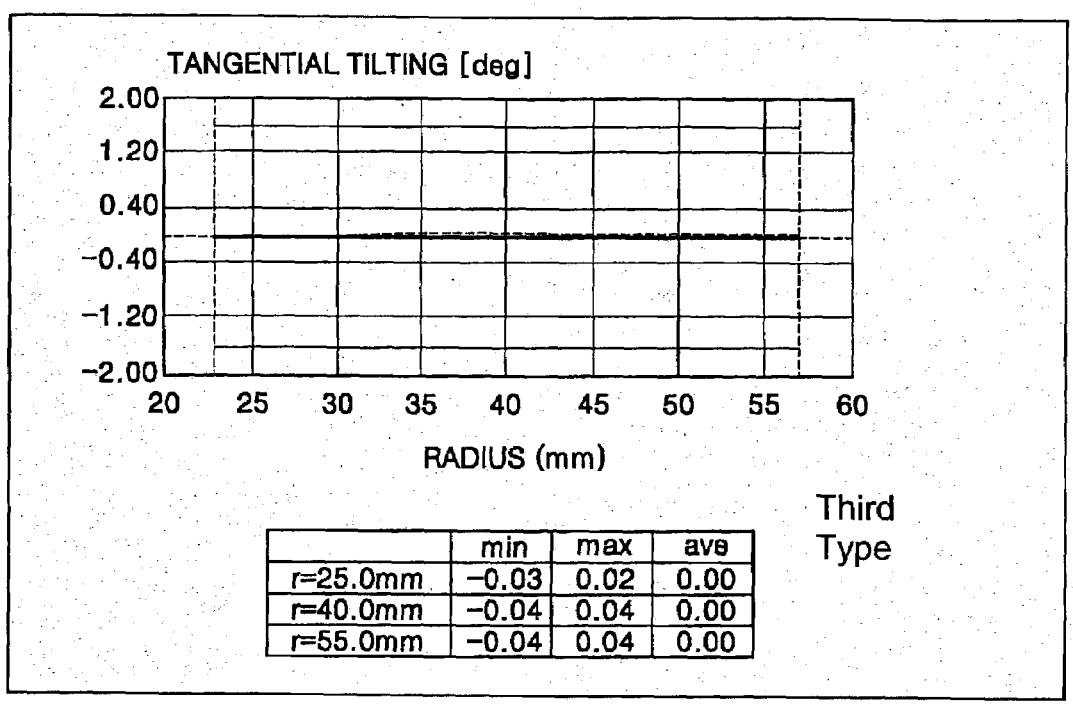
Figure 4D:
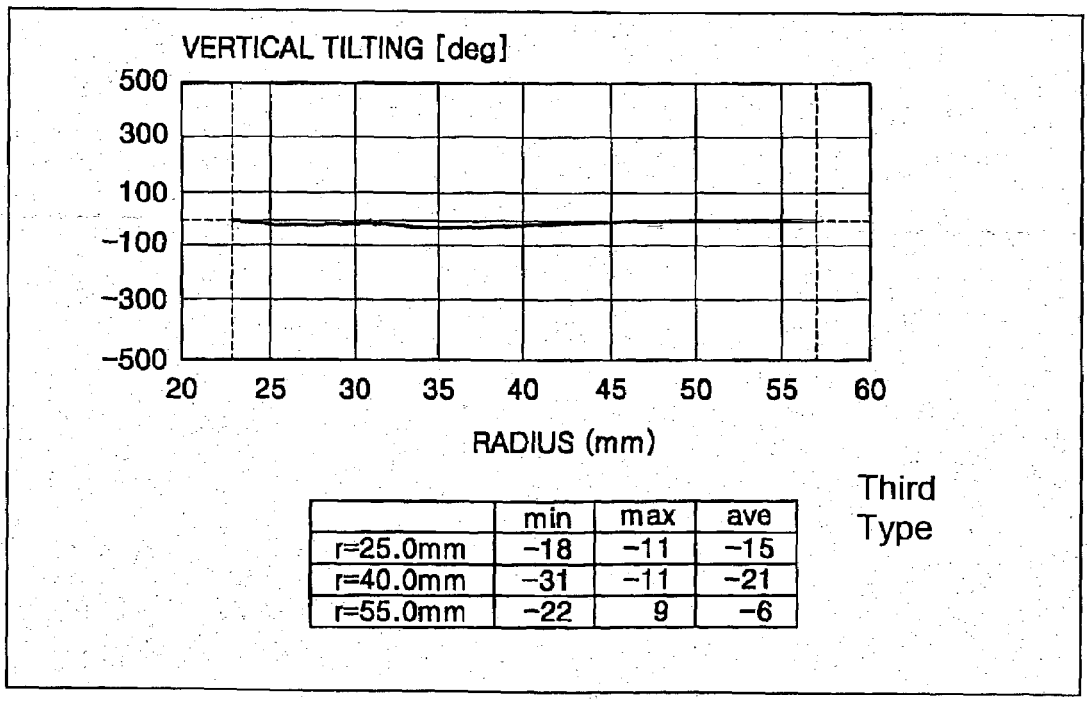
Figure 5A:
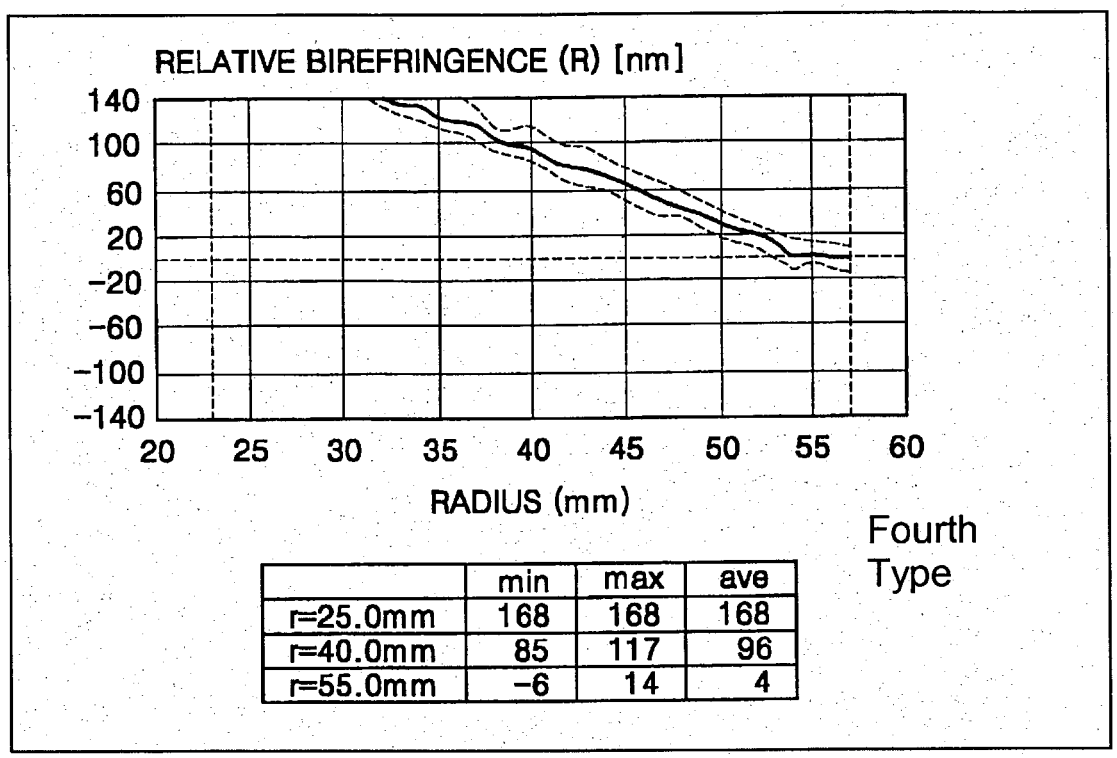
Figure 5B:
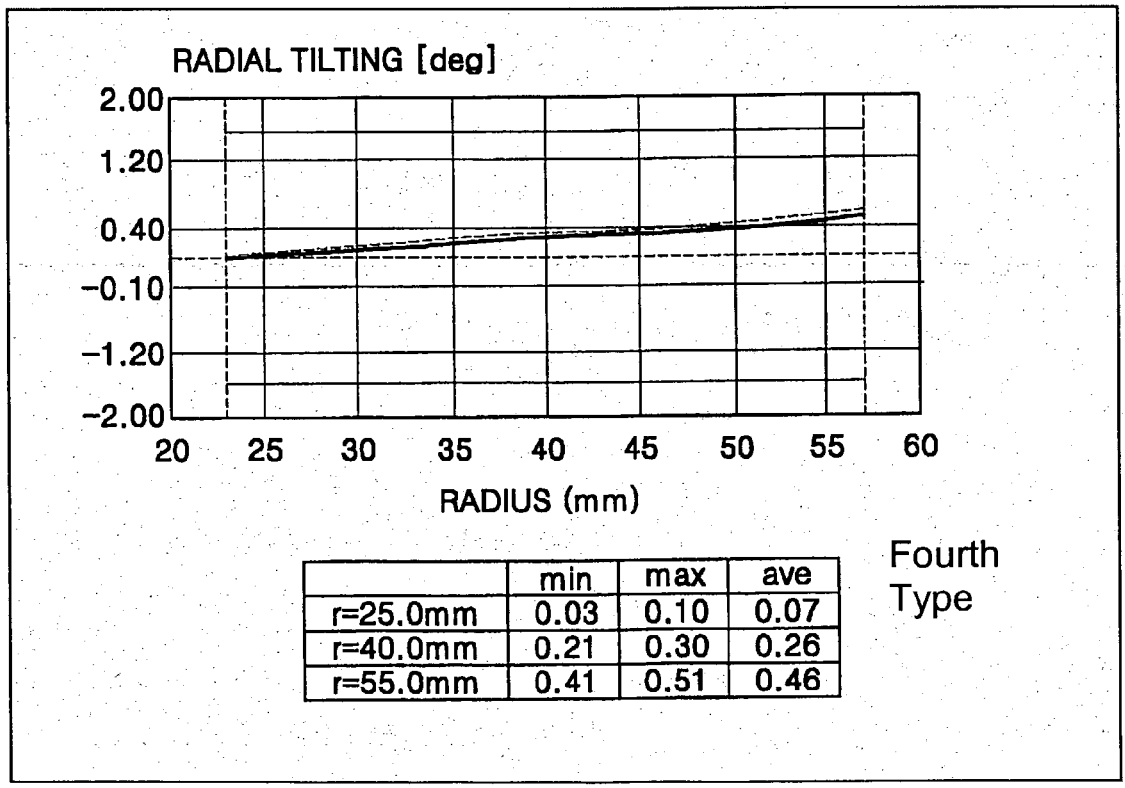
Figure 5C:
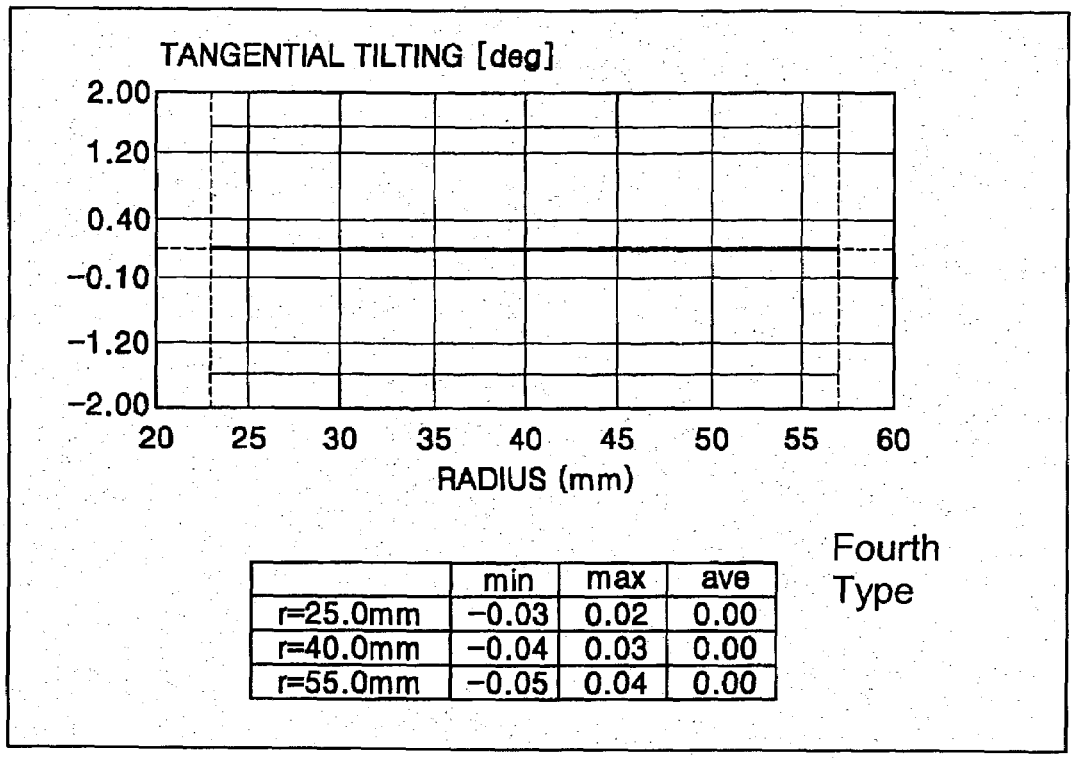
Figure 5D:
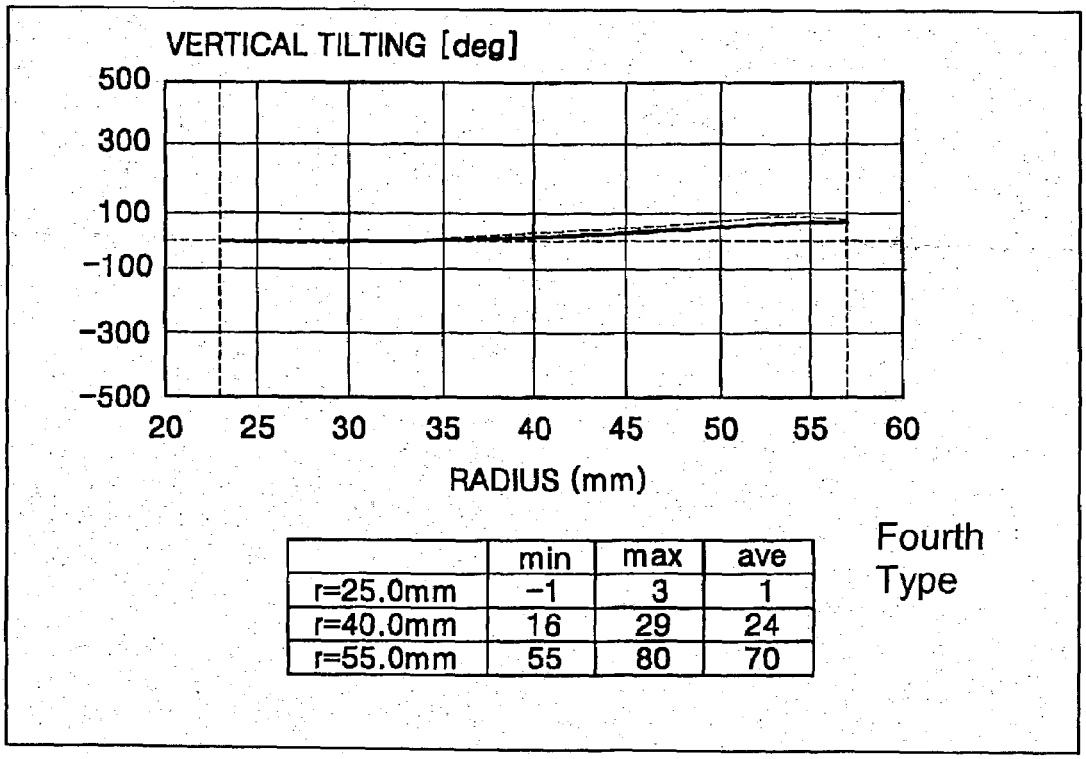
Figure 6A:
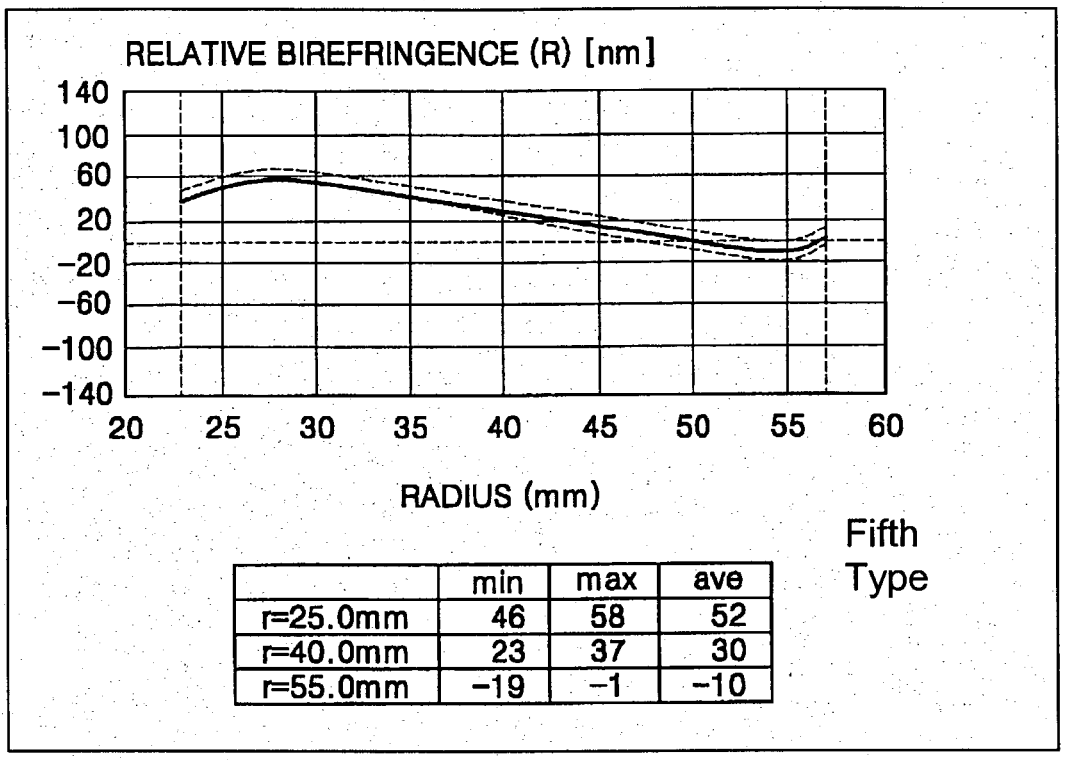
Figure 6B:
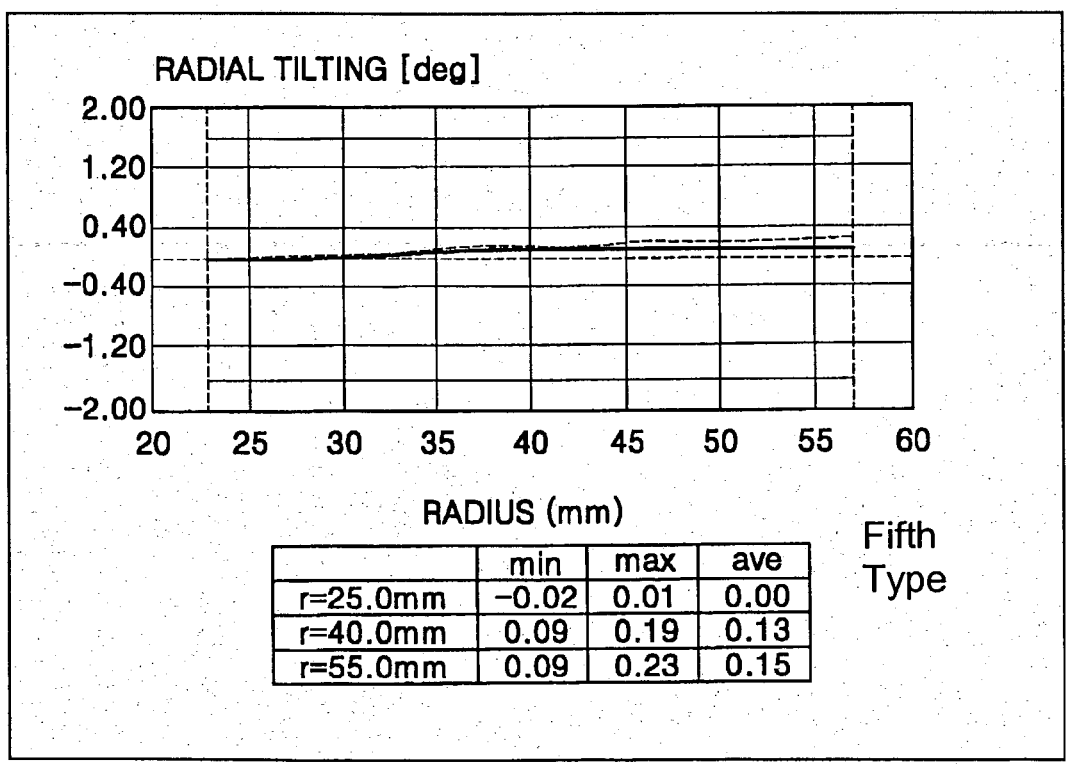
Figure 6C:
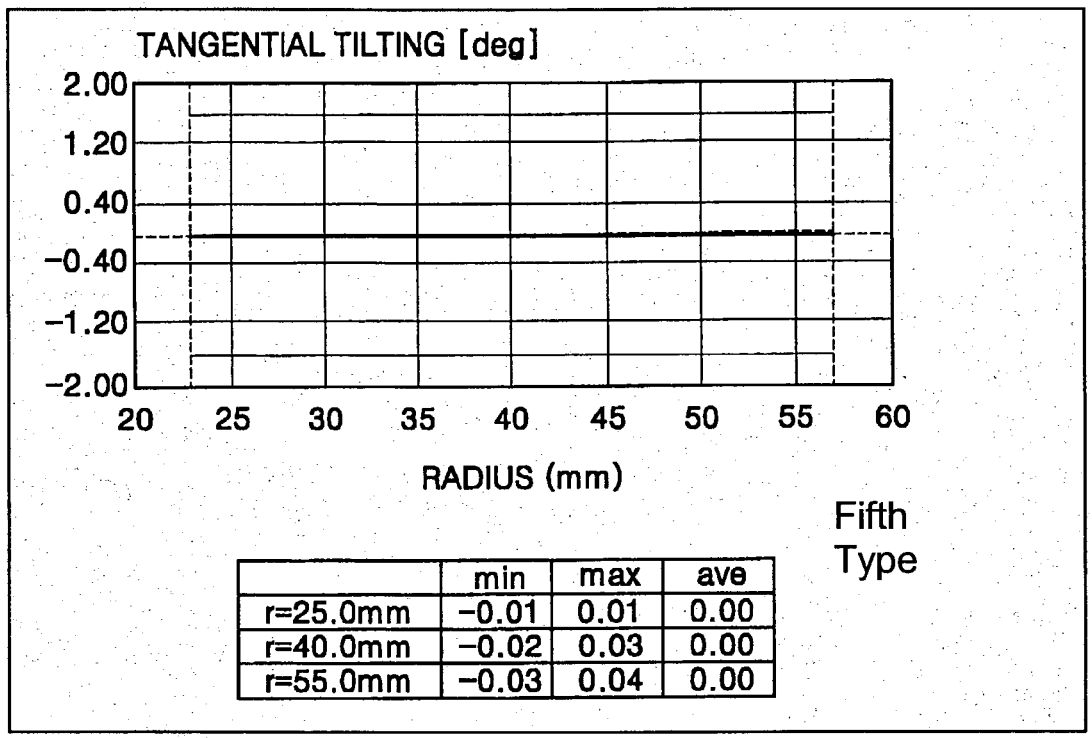
Figure 6D:
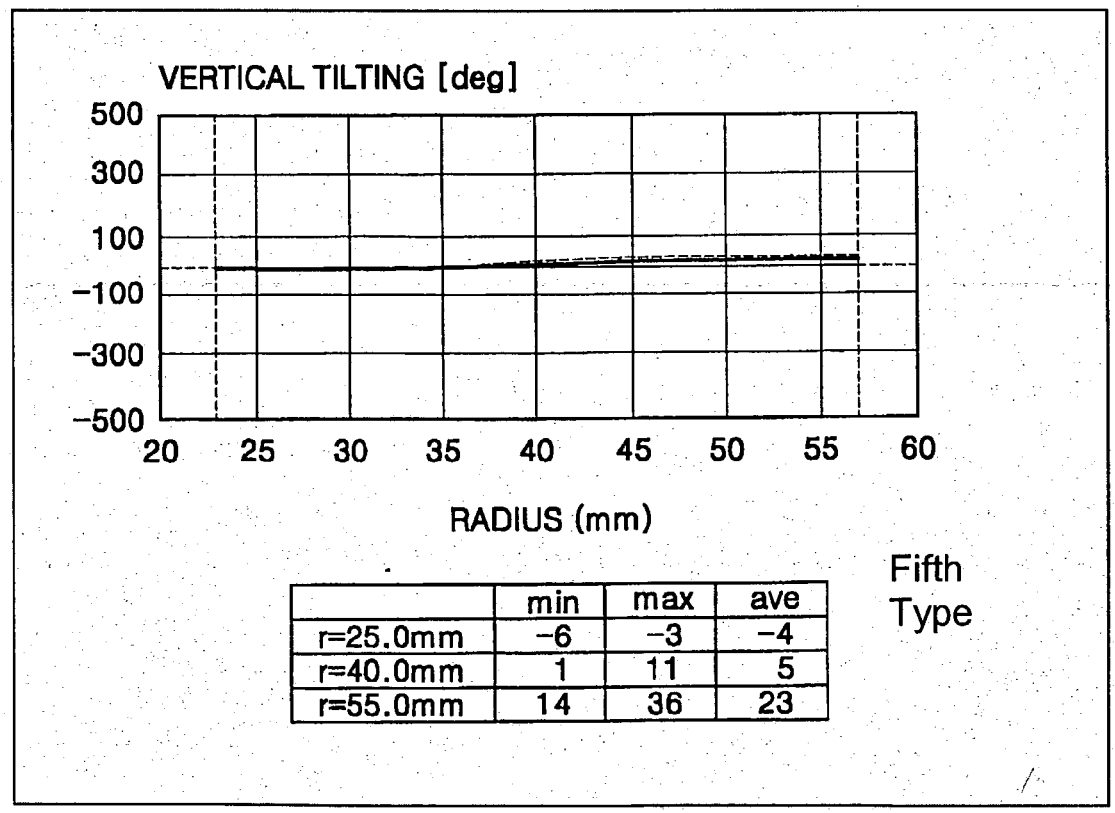
Figure 7A:
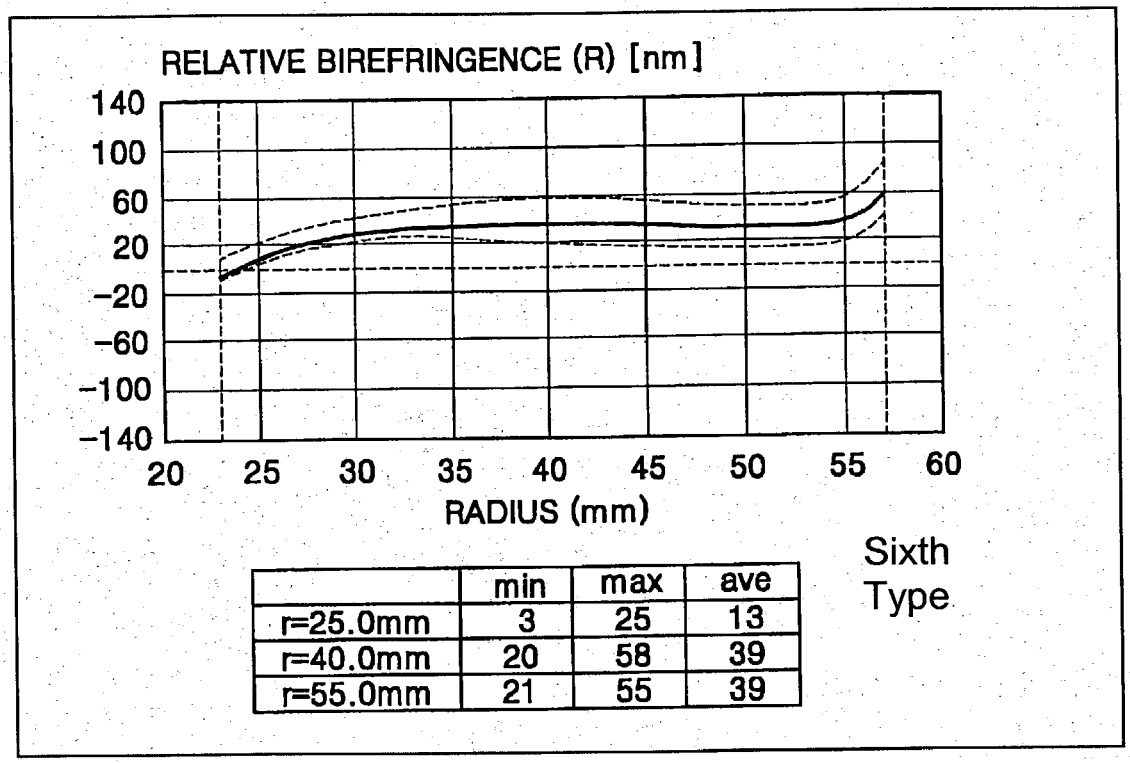
Figure 7B:
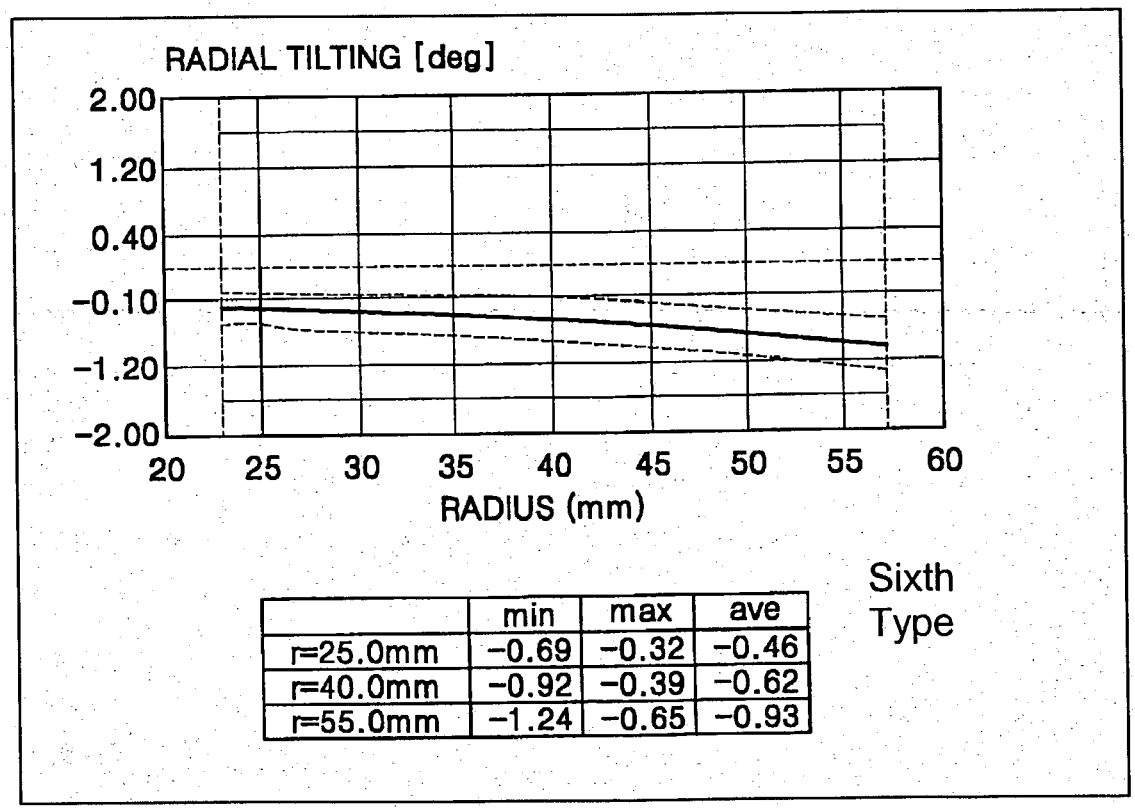
Figure 7C:
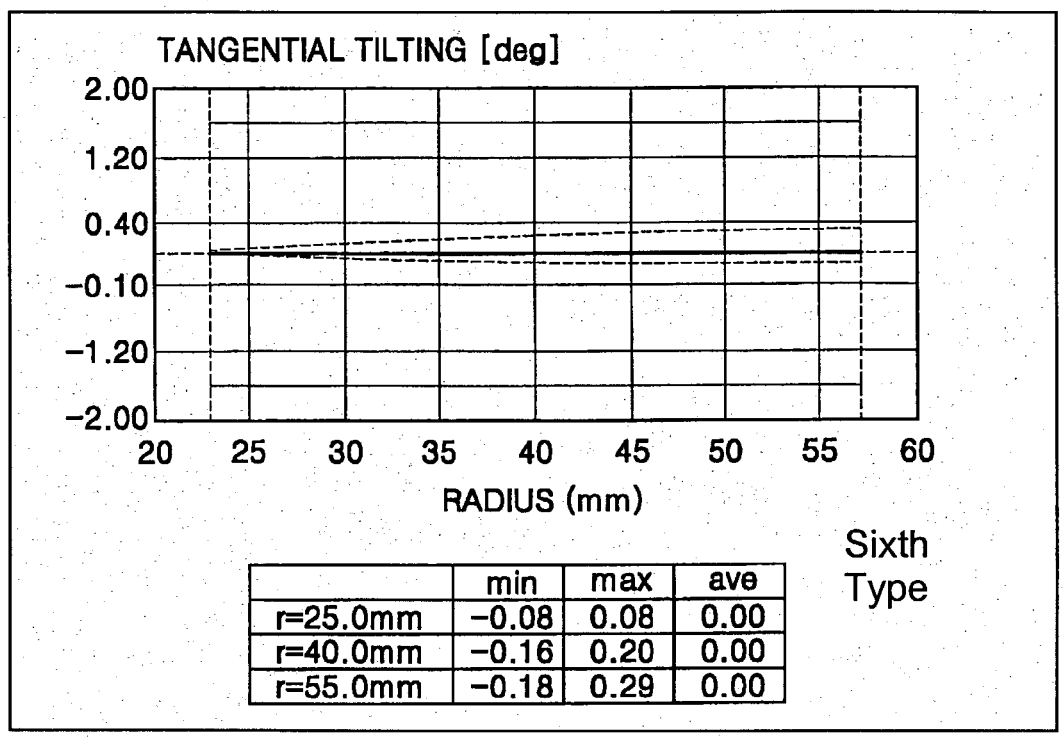
Figure 7D:
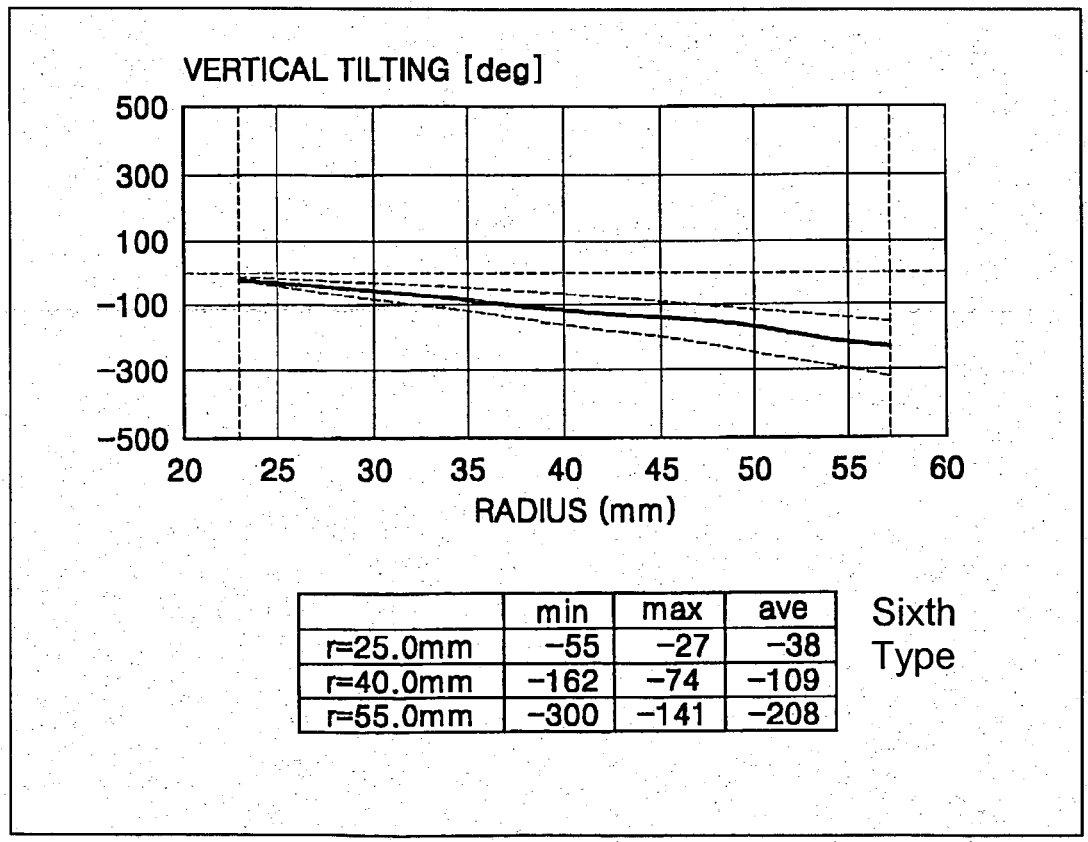
Figure 8A:
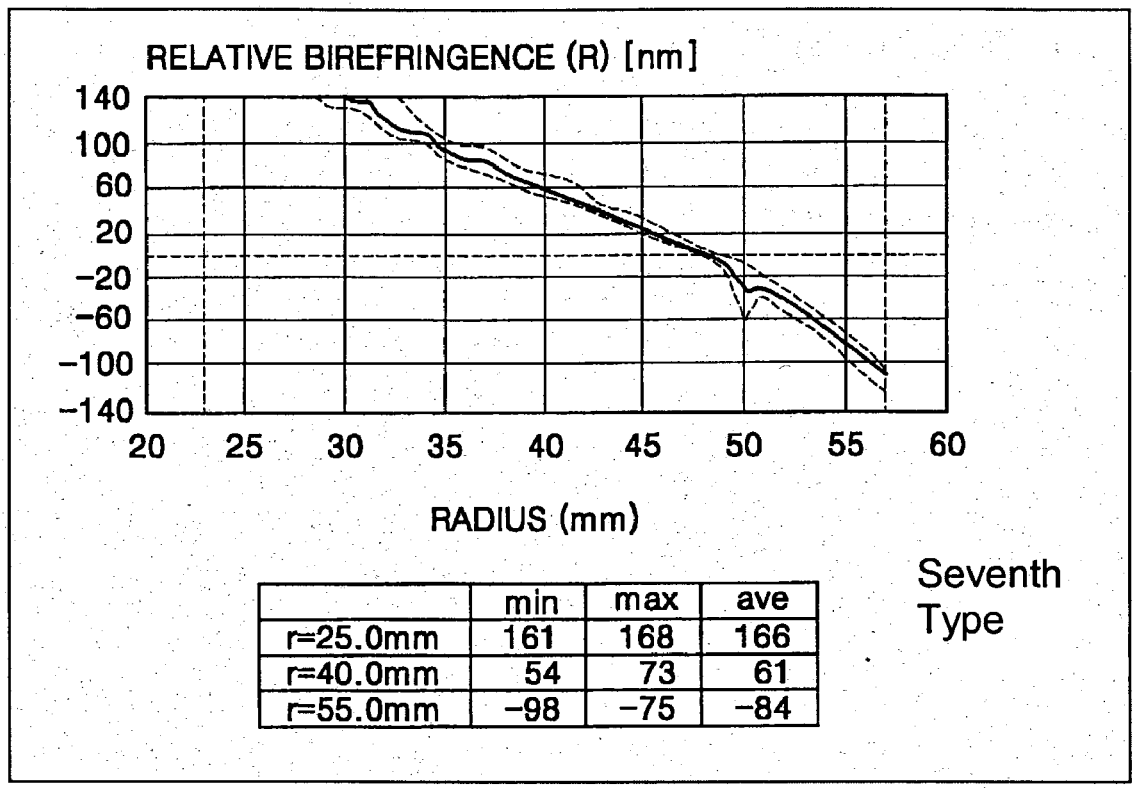
Figure 8B:
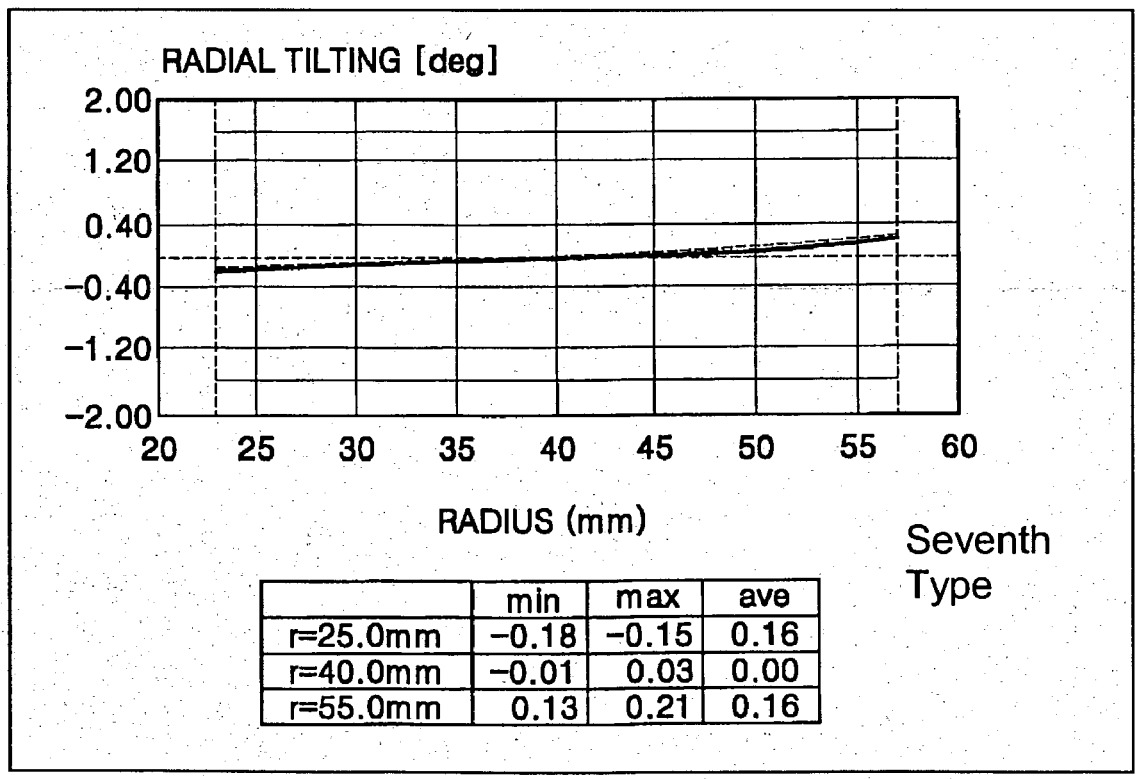
Figure 8C:
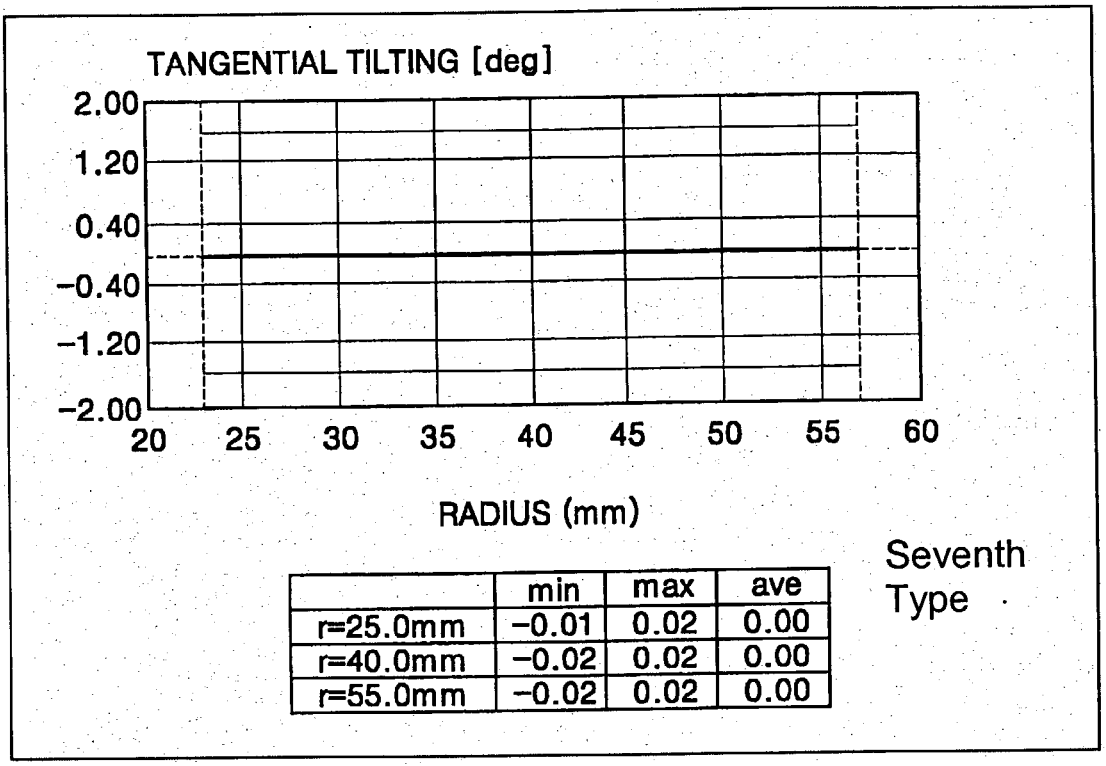
Figure 8D:
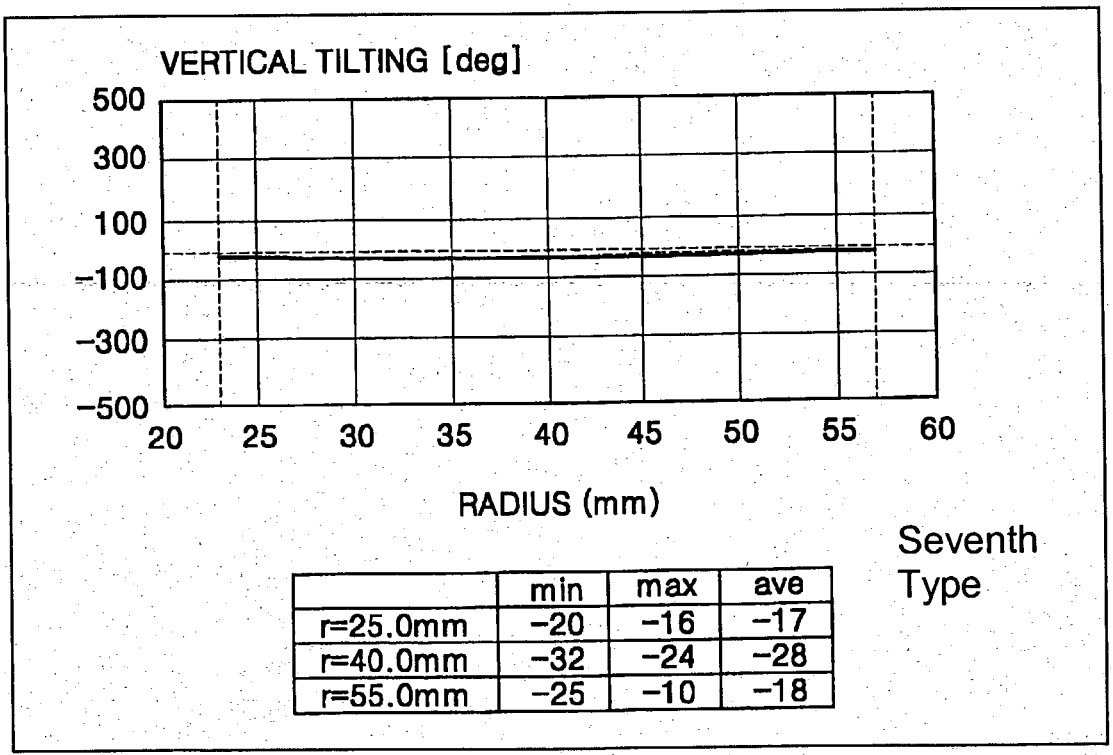
Figure 9A:
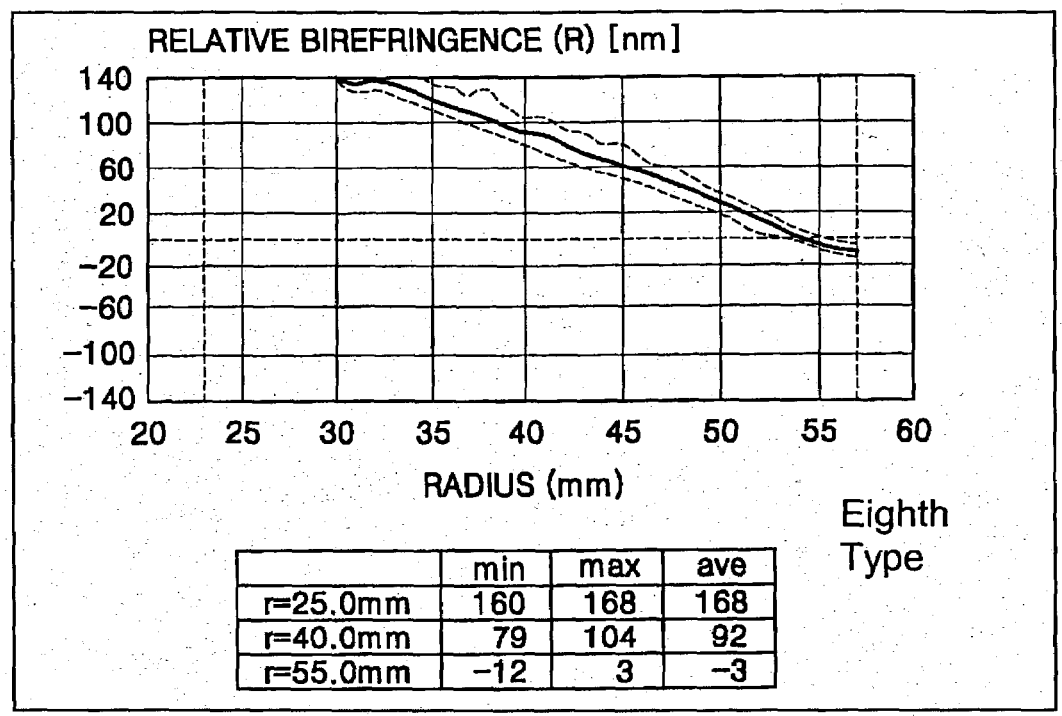
Figure 9B:
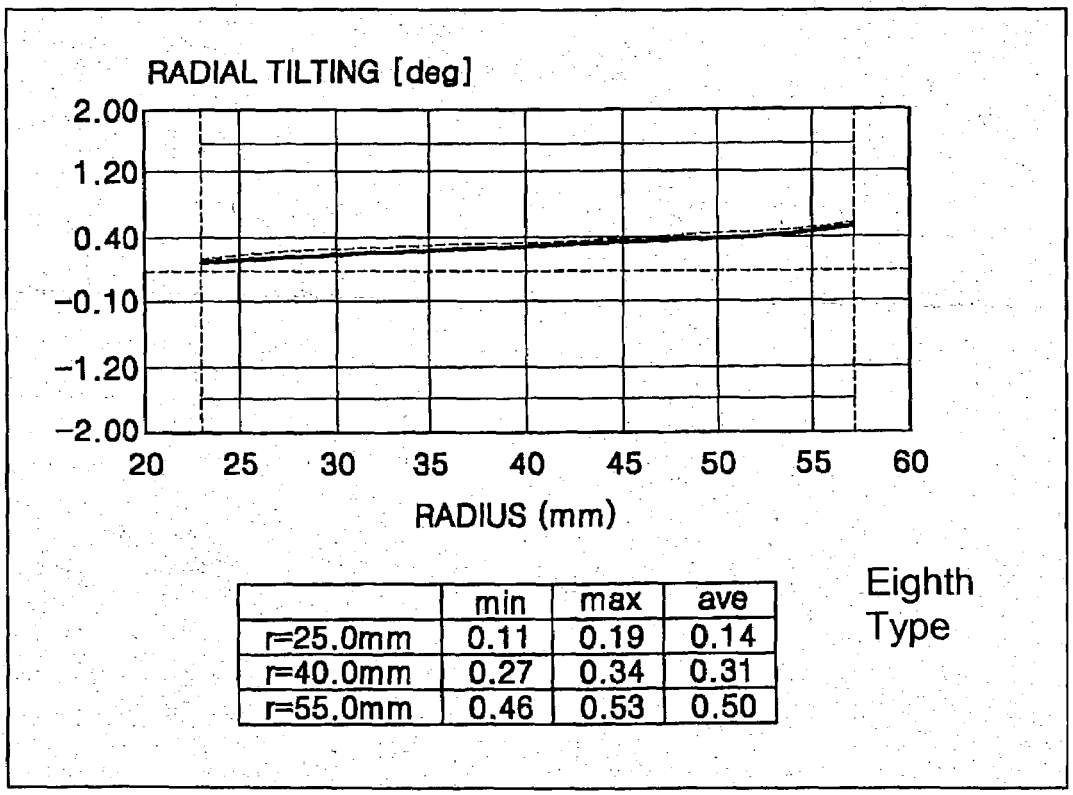
Figure 9C:
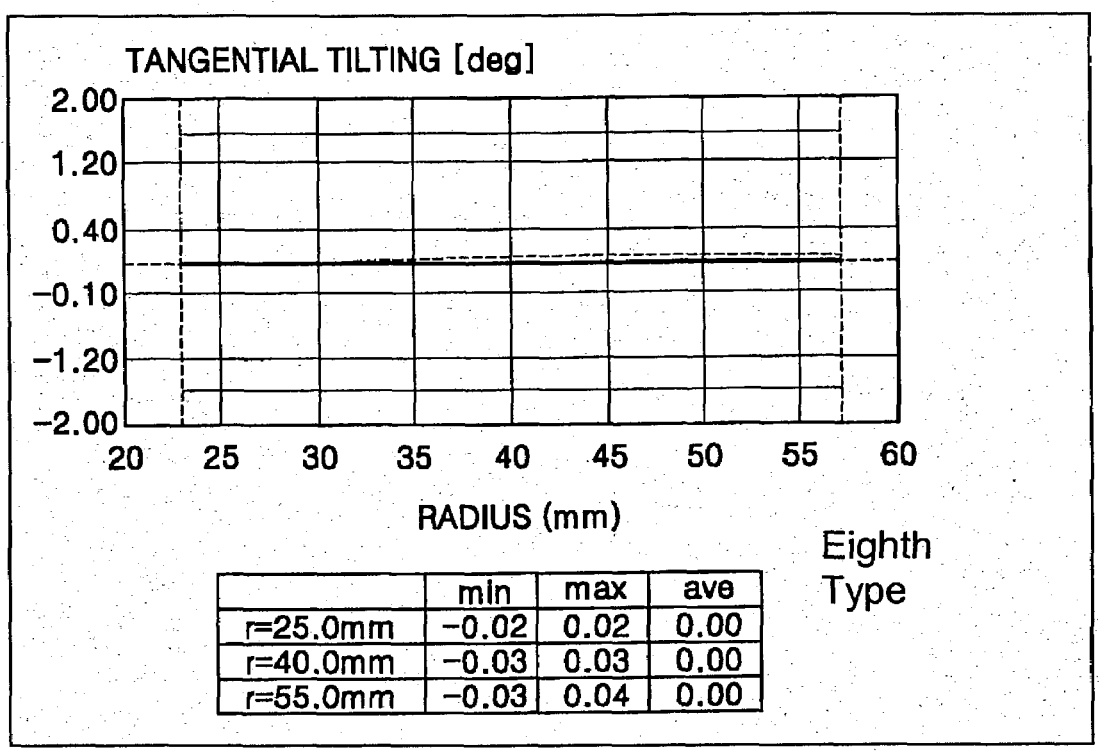
Figure 9D:
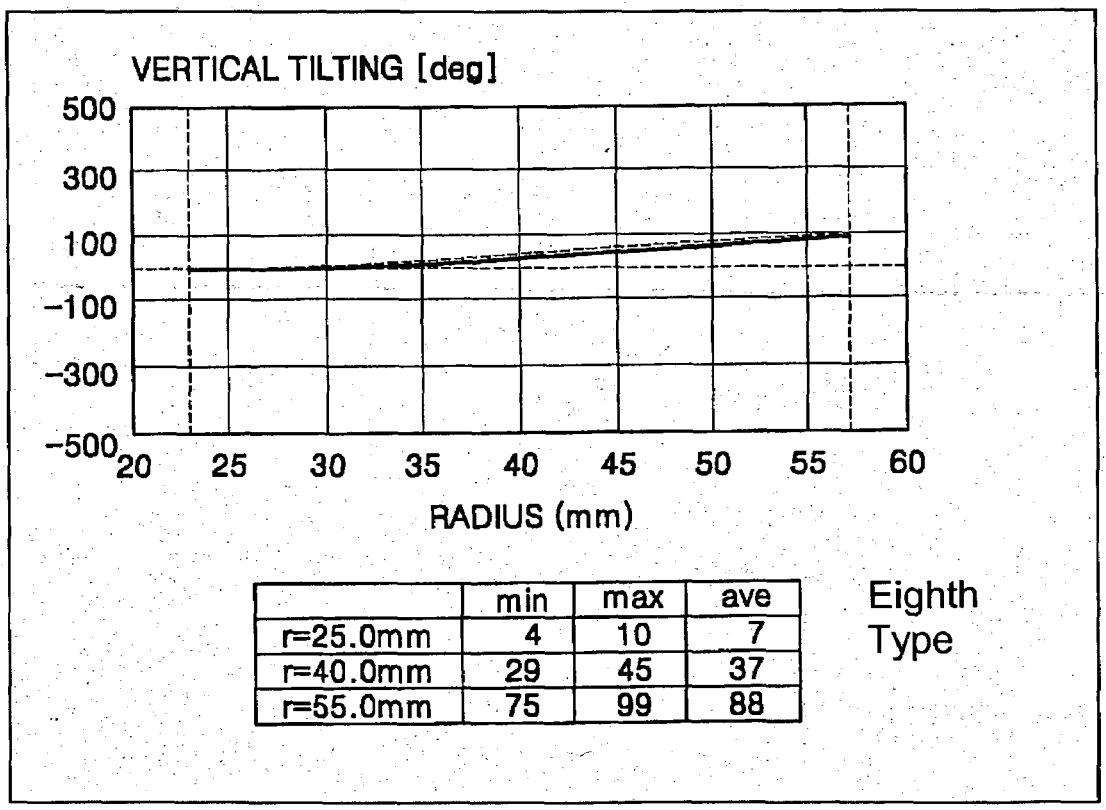
Figure 10A:
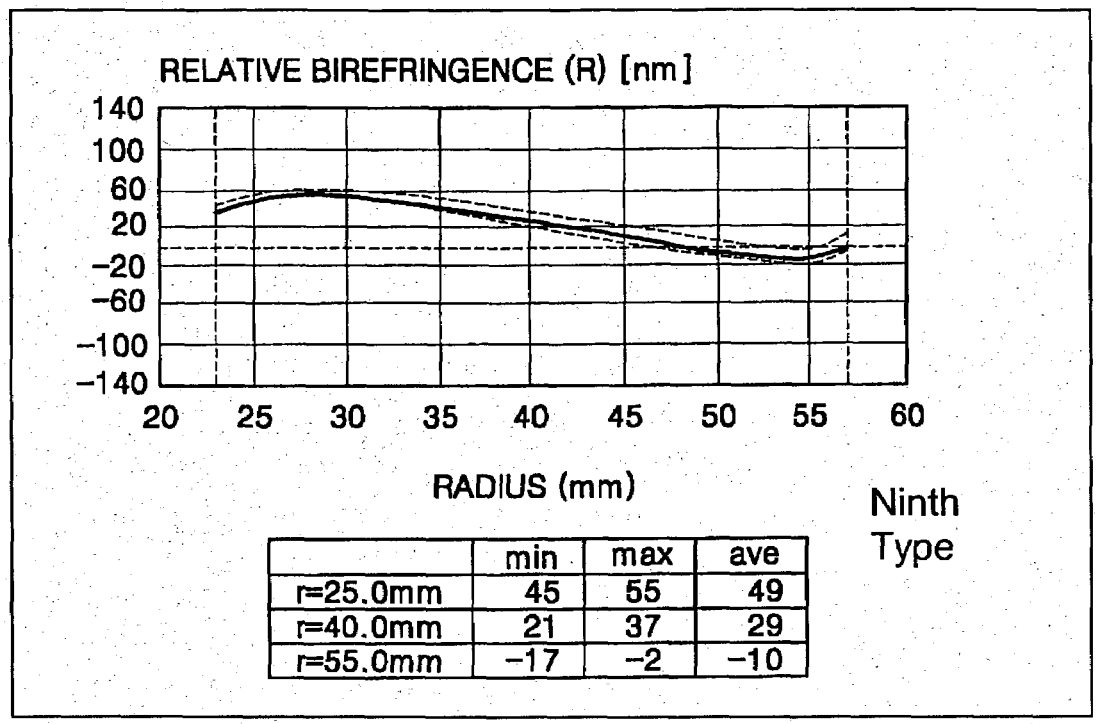
Figure 10B:
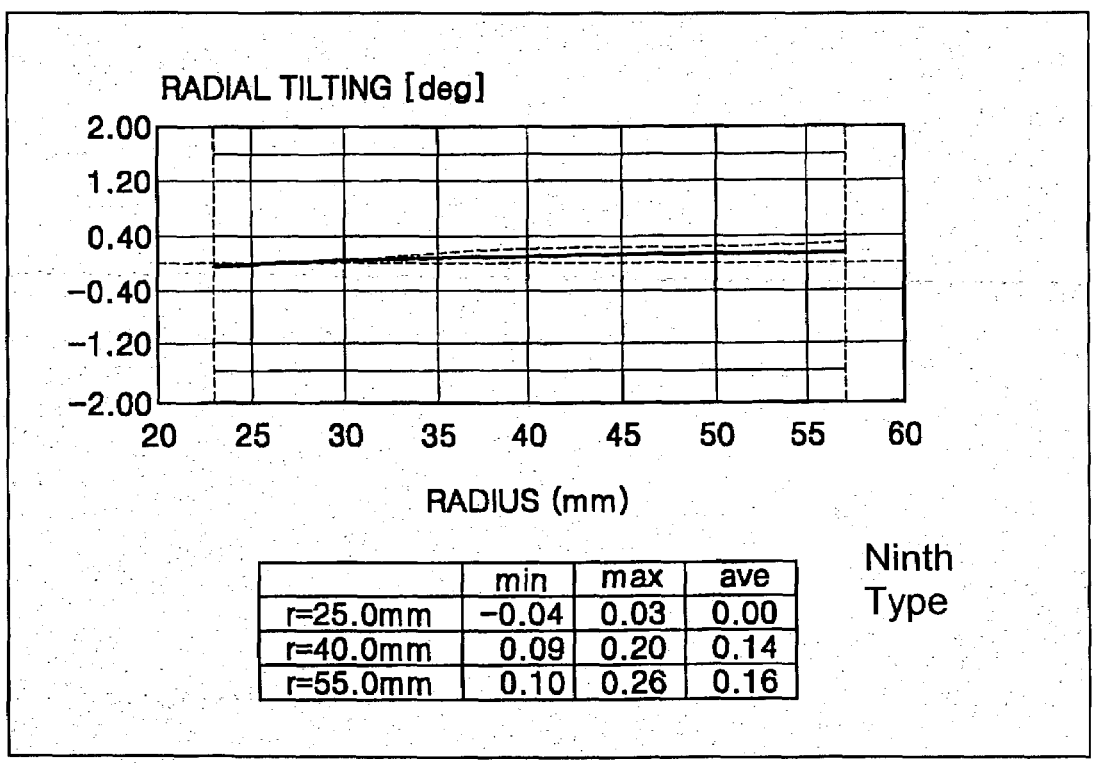
Figure 10C:
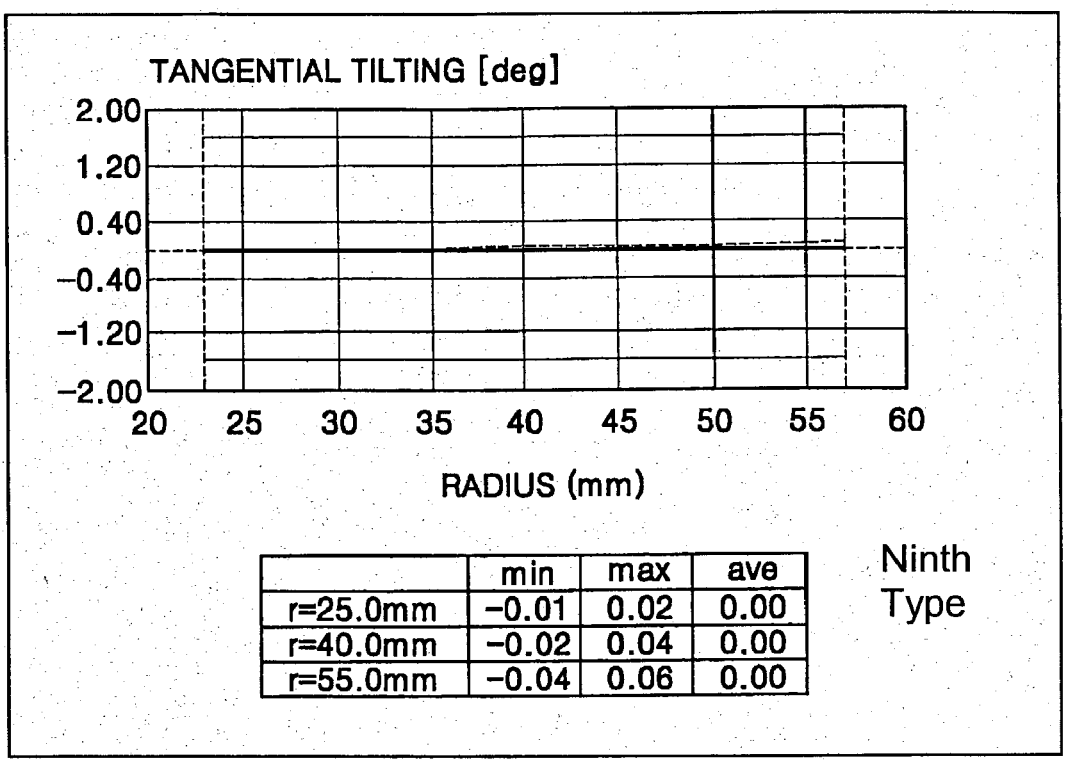
Figure 10D:
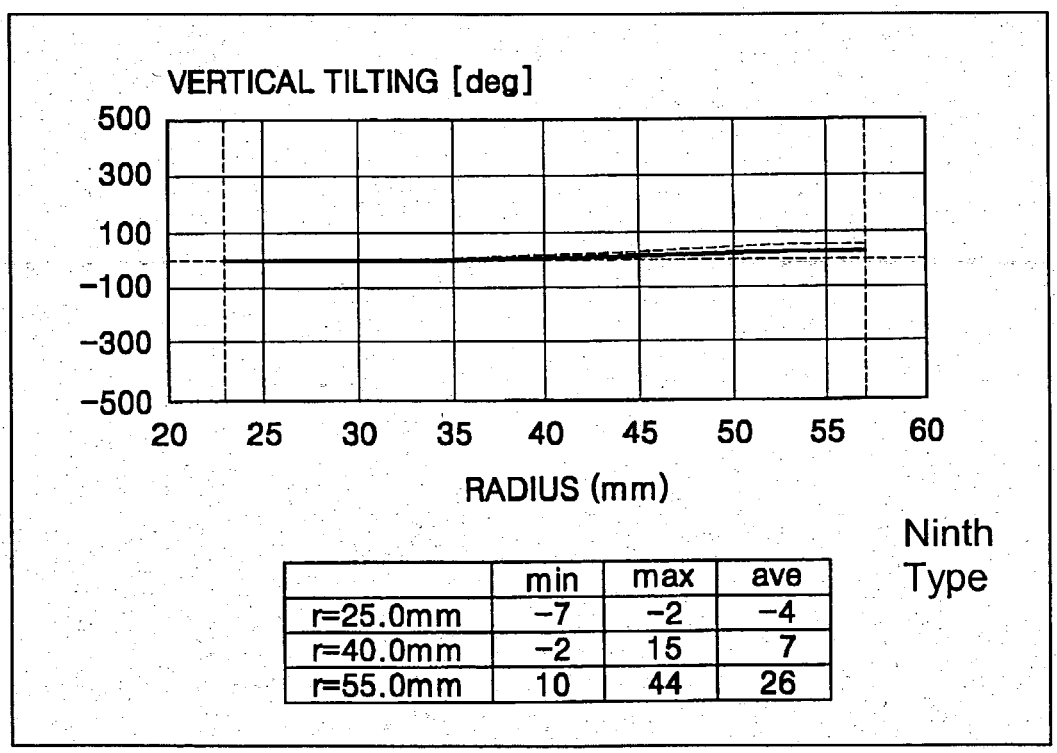
Figure 11A:
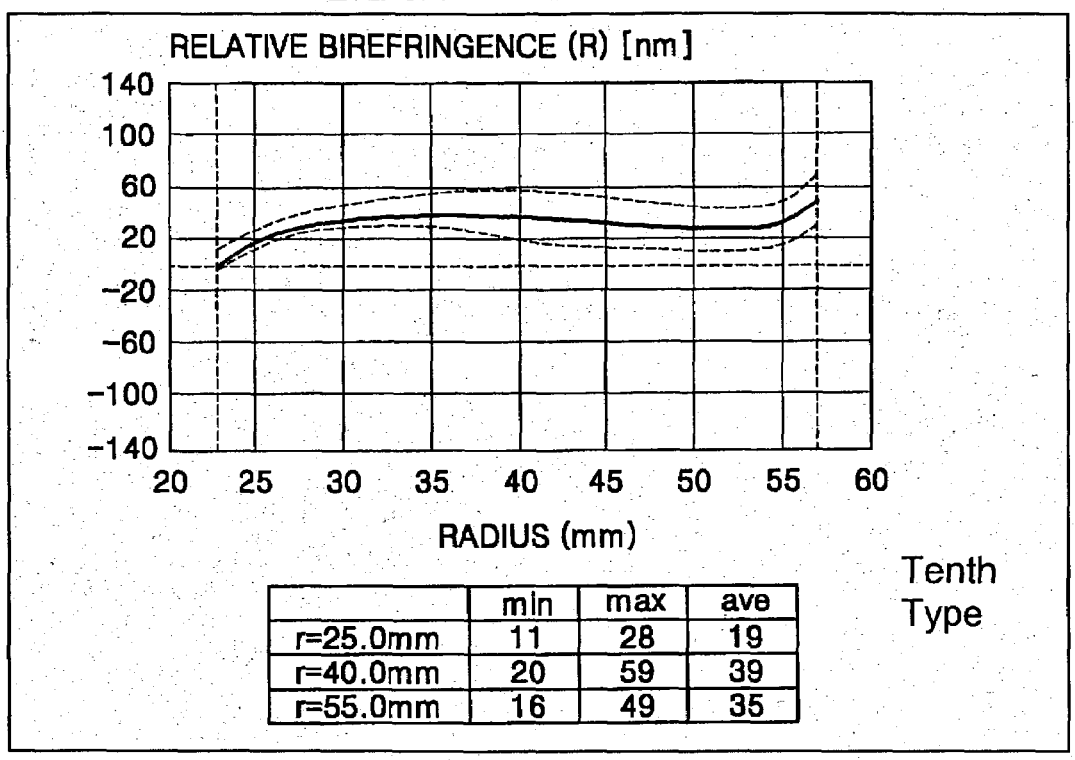
Figure 11B:
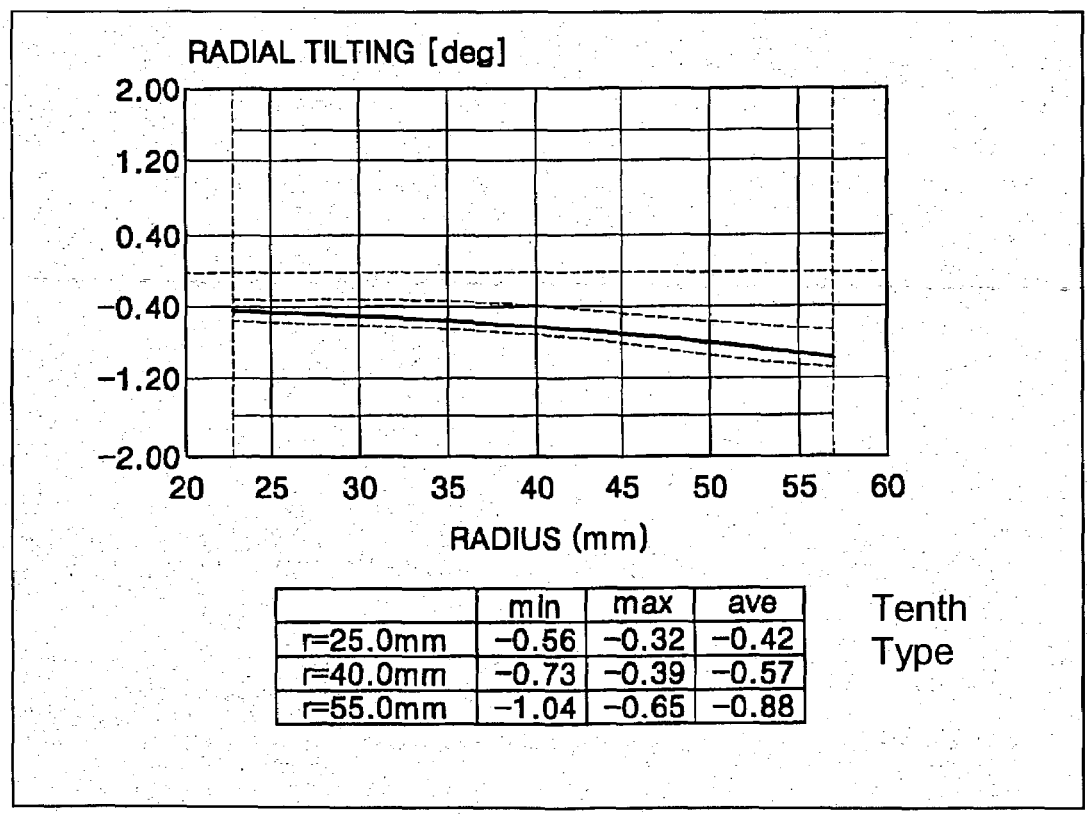
Figure 11C:
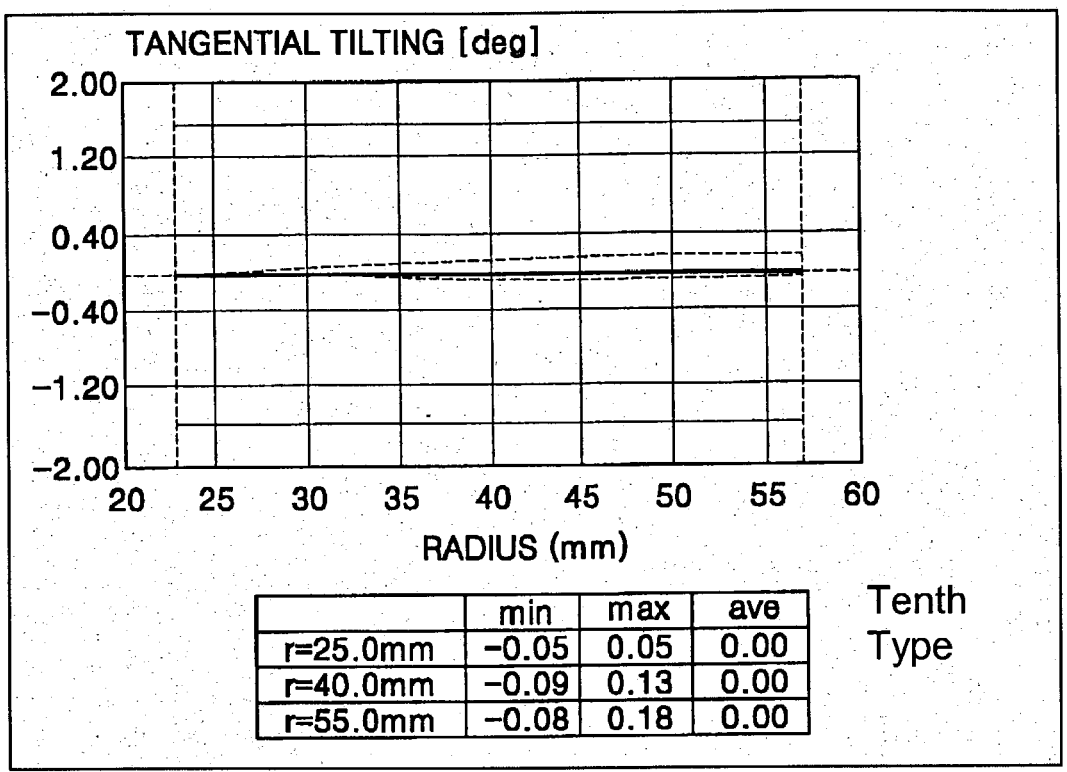
Figure 11D:
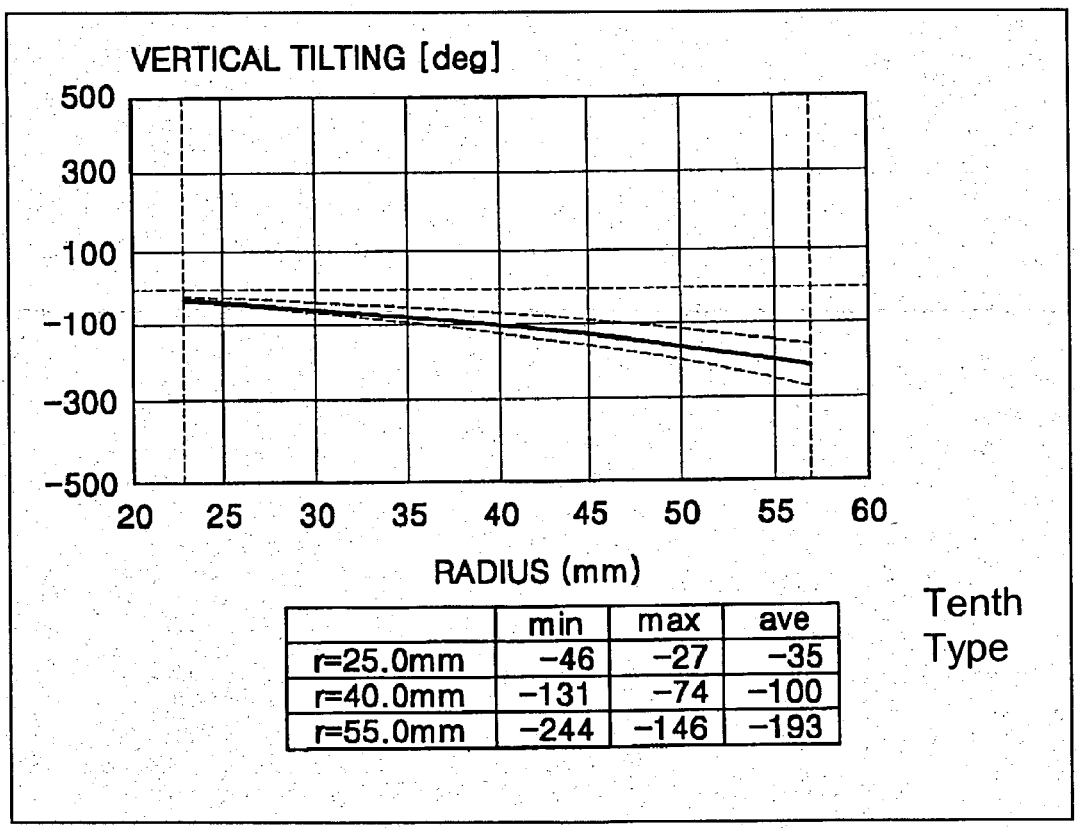
Figure 12A:
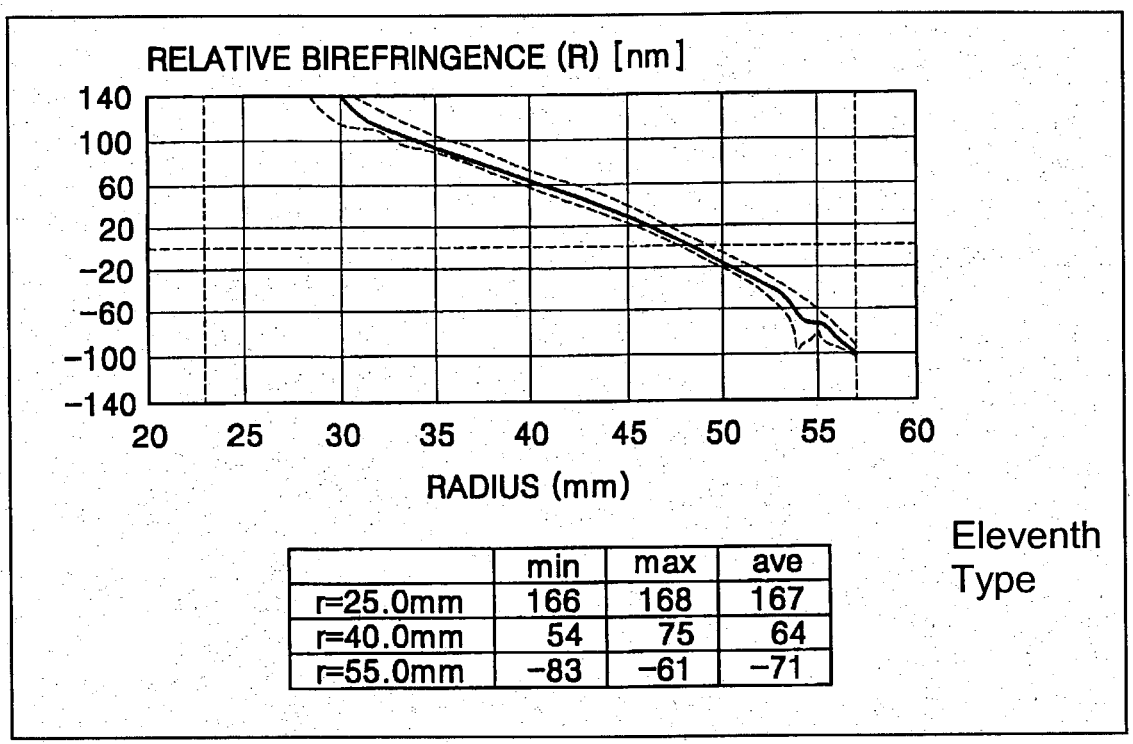
Figure 12B:
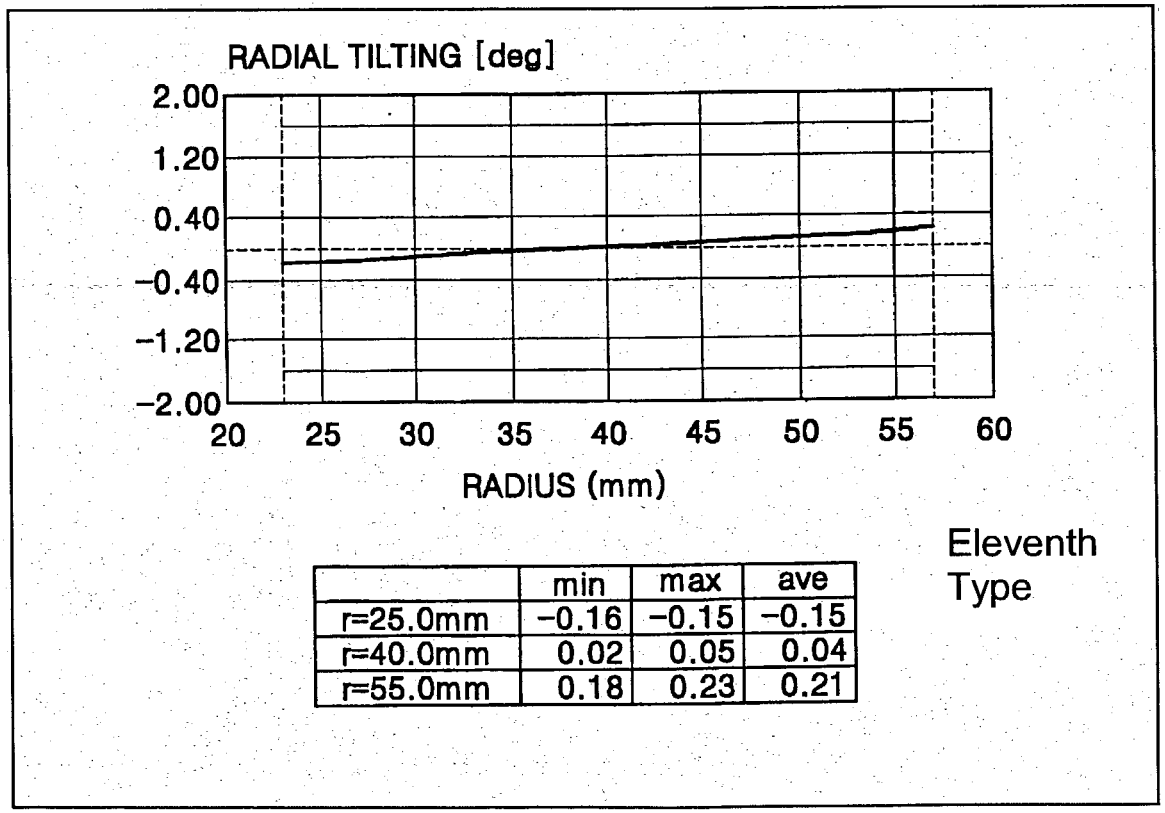
Figure 12C:
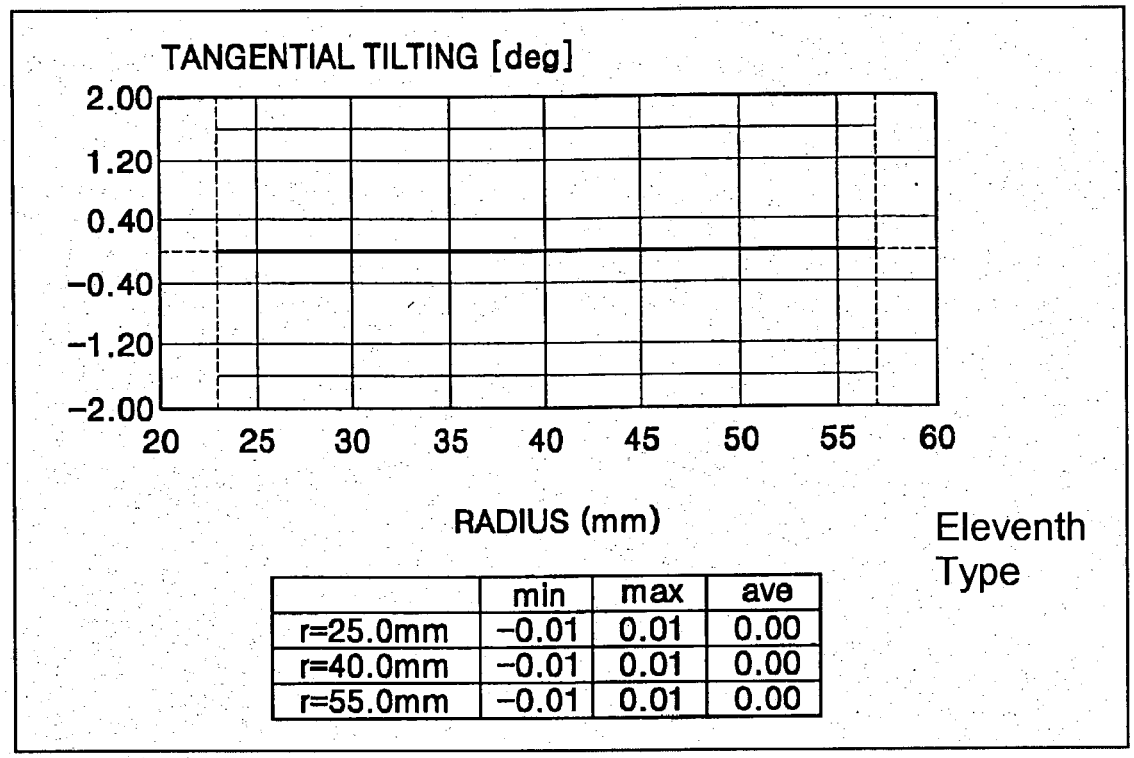
Figure 12D:
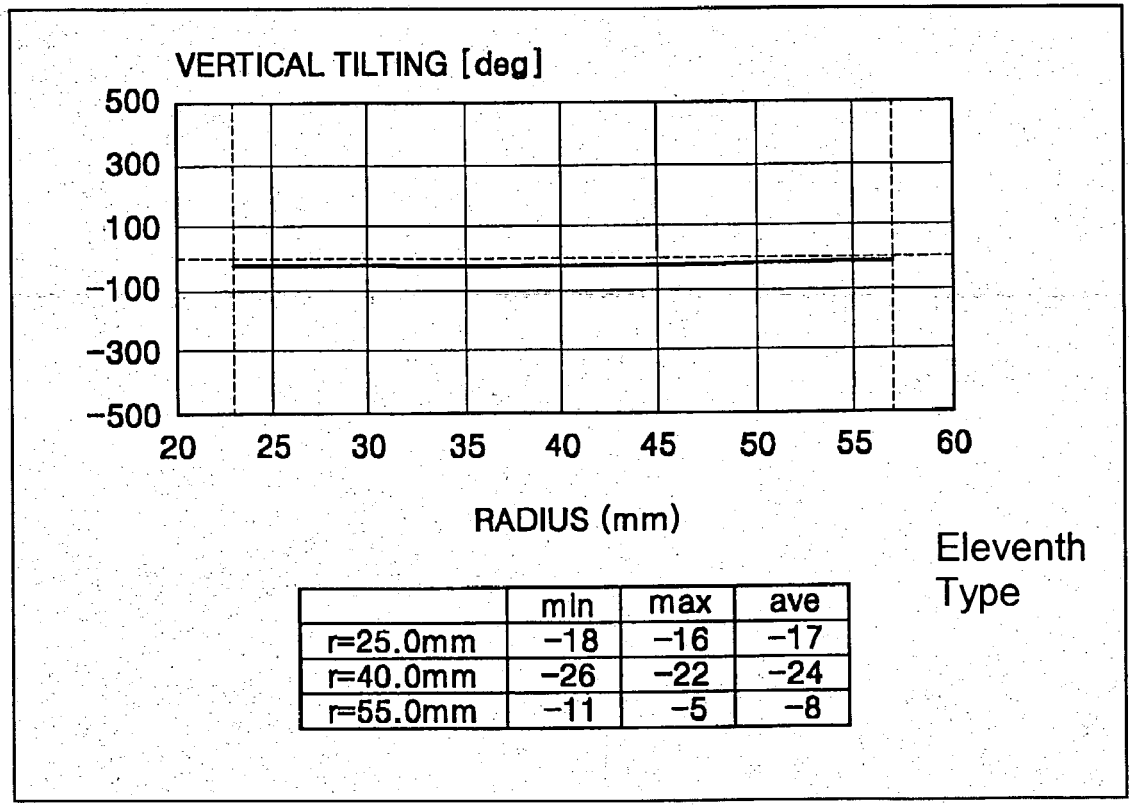
Figure 13A:
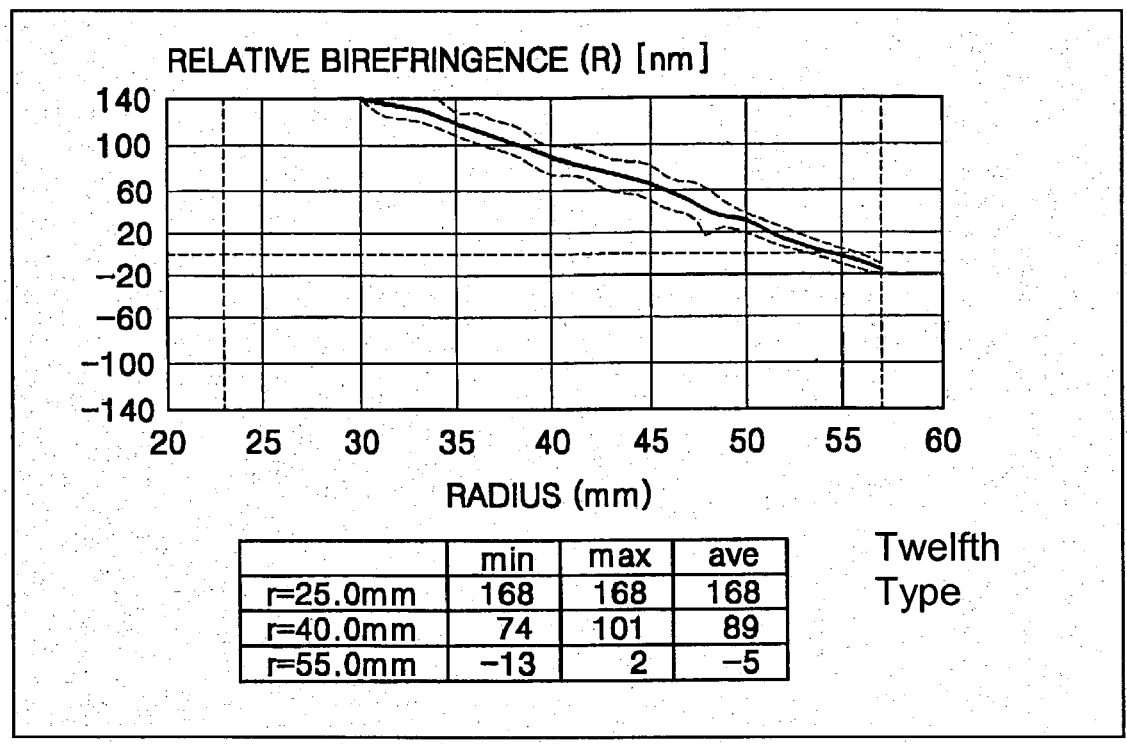
Figure 13B:
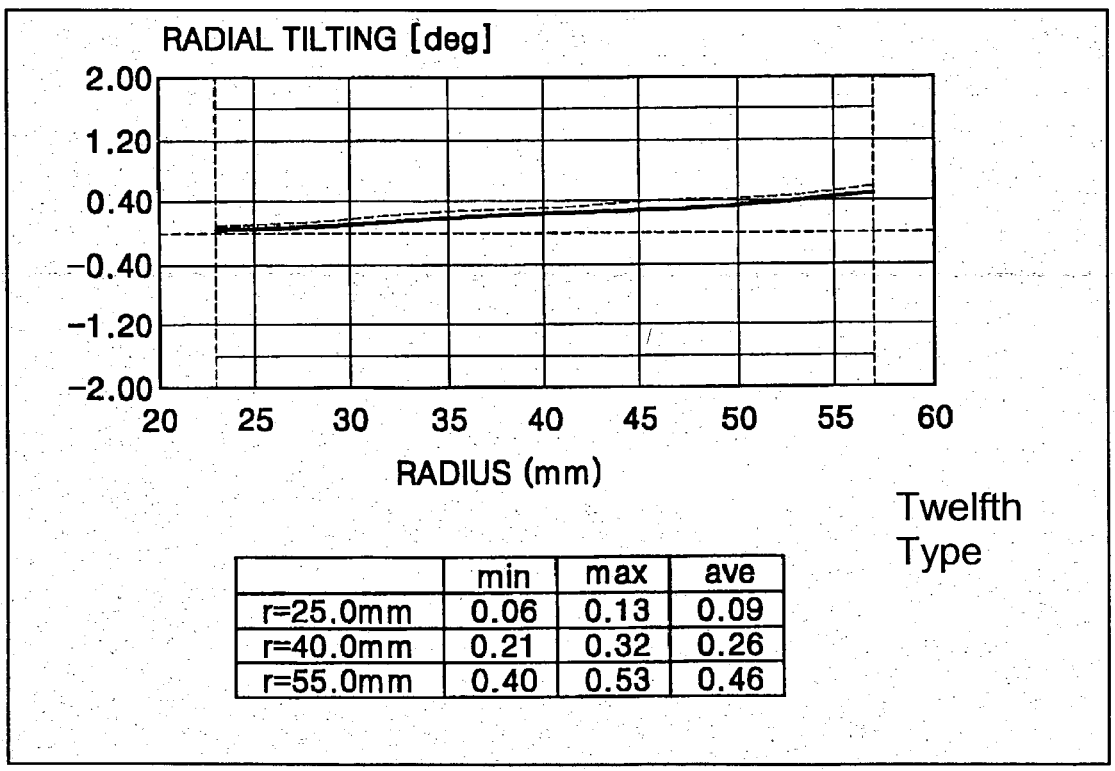
Figure 13C:
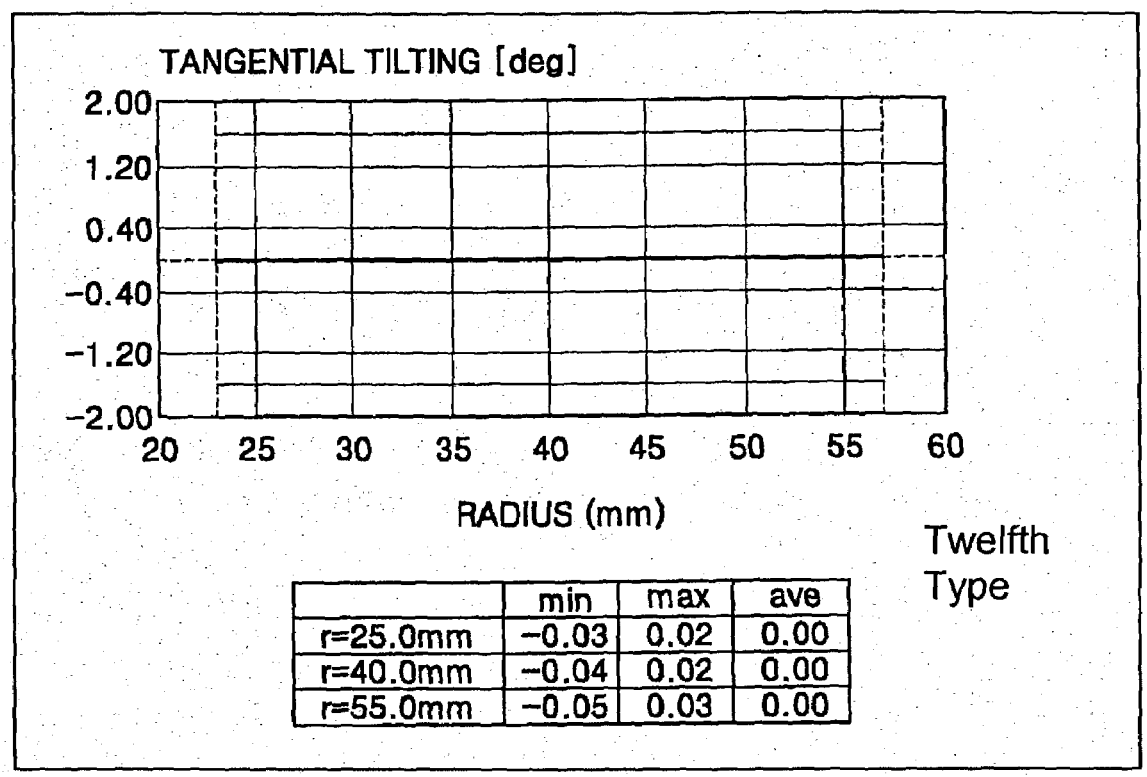
Figure 13D:
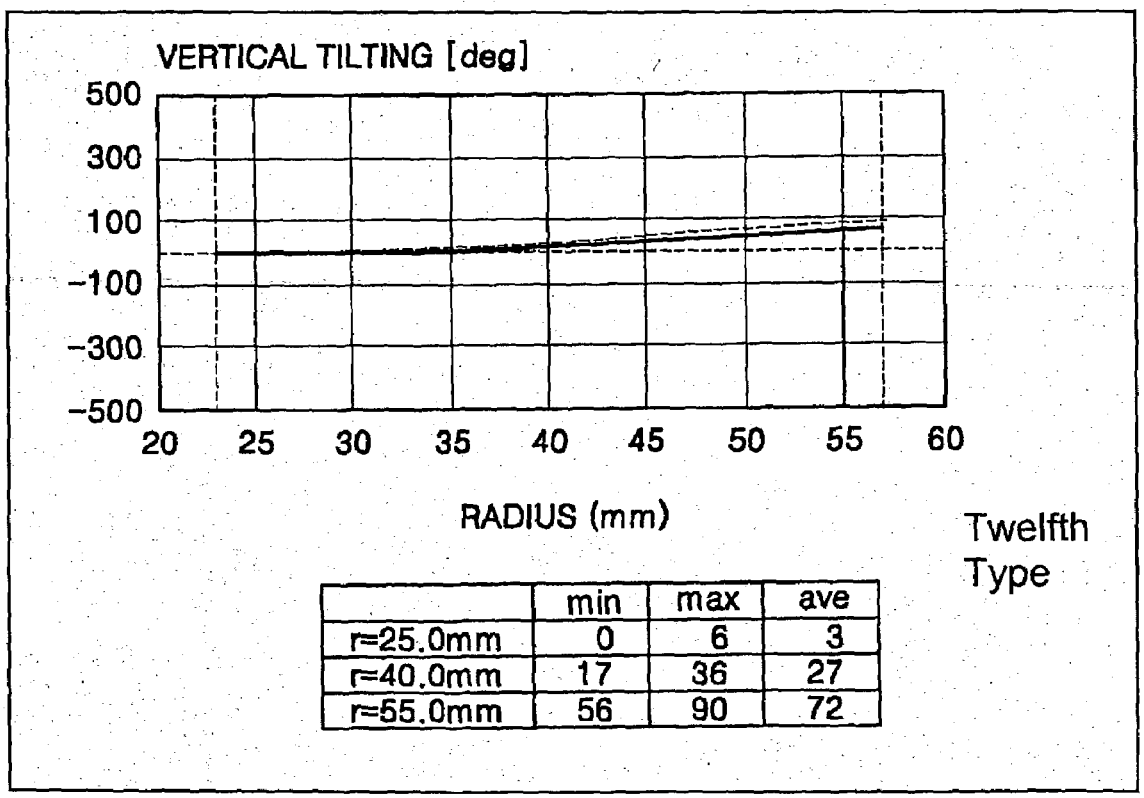

Reference will now be made in detail to the embodiments of the present invention, examples of which are illustrated in the accompanying drawings, wherein like reference numerals refer to the like elements throughout. The embodiments are described below in order to explain the present invention by referring to the figures.

A disc according to an embodiment of the present invention is manufactured by accounting for frequently occurring defect factors affecting a recording/reproducing capacity of an optical disc drive (ODD). Such a disc is referred to as a marginal disc.

In the present invention, factors causing defects are quantified based on the results of periodical analyses of defective discs. These results are shown in Table 2 below. Here, a disc specification represents a specification of a normal disc and a manufactured specification provides the lowest limits specified for the manufacture of the marginal disc according to an embodiment of the present invention. For example, a normal disc may refer to a disc which satisfies disc specifications and does not generate errors during a reproduction of data recorded on the disc, and a marginal disc may refer to a disc whose specifications are for the most part within the range of the specifications for a normal disc, but errors may occur during a reproduction thereof.

TABLE 2

| No | Factor | Changes in Stamper Process | | Changes in Injection and Reflective layer Processes | | Factors Affecting ODD |
|---|---|---|---|---|---|---|
| | | Disc Specification | Manufactured Specification | Disc Specification | Manufactured Specification | |
| 1 | Track Pitch (μm) | 1.5–1.7 | 1.35 | | | seek delay and fail, lead-in time delay and fail. |
| 2 | Push-pull | 0.04–0.07 | 0.02 | | | seek delay and fail, lead-in time delay and fail in ODD using phase difference push-pull |
| 3 | Eccentricity (μm) | 70 | 50 | | | Jumping when stopping and seek fail, oscillation phenomenon occurs in tracking when reproducing at a high speed |
| 4 | Symmetry (%) | −15–5 | −20 | | | Data reproduction fails because a data slicer causes a problem when reproducing. |
| 5 | Reflectivity (%) | | | 70 | 45 | Data reproduction fails because a data slicer causes a problem when reproducing. |
| 6 | Birefringence (nm) | | | 100 | 150 | Data reproduction fails due to high jitter rate when reproducing. |
| 7 | Tilting (degree) | | | −0.5–0.5 | 0.5 | Seek or data reproduction fails due to focus drop and vibration when reproducing. |

Referring to Table 2, defect factors of a disc include a track pitch, a push-pull, an eccentricity, a symmetry, a reflectivity, a birefringence, and a tilting of the disc. In particular, factors that greatly affect the reproduction capacity of the disc include the reflectivity, birefringence, and tilting. As shown in Table 2, the reflectivity of the marginal disc is set to be within a range of 45–70% and the birefringence of the marginal disc is set to be within a range of 100–150 nm. Additionally, the track pitch of the marginal disc is set to be within a range of 1.35±0.3 μm, the push-pull of the marginal disc is set to be within a range of 0.02±0.005, and the symmetry of the marginal disc is set to be within a range of −20±5. The tilting of the marginal disc is set to have a value greater than 0.5 degree.

When manufacturing a stamper, the track pitch may vary due to the deterioration of the symmetry characteristic, a change in the reflectivity, and a current recording density. Under the injection conditions, a birefrigence and push-pull may occur. These factors greatly affect the reproducing/recording capacity of the disc and are considered in the present invention.

FIG. 1 shows a method of manufacturing a general disc. In operation 100, a master is manufactured. In operation 105, a pitch corresponding to a digital signal of a tape master is formed by modulating the digital signal of the tape master using a laser beam recorder, reaching a CD image from a source, and exposing and developing a photoresist with a laser. In operation 110, Ni is deposited on the completely developed glass and a glass master is manufactured to make a stamper. In operation 115, a metal master is made by plating a surface of the glass master with Ni, thereby manufacturing the stamper. Here, the manufactured stamper is inspected to sort out defective stampers. In operation 120, the stamper is attached to a mold so as to repeatedly mold transparent substrates of CDs. In operation 125, a surface, on which pits of the transparent substrates manufactured in the molding process are formed, is coated with Al to form a reflective layer, and the reflective layer is coated with a protective layer so as to prevent the reflective layer from being oxidized. In operation 130, the completed disc is tested, a label for titles and players is printed on the protective layer of the disc that passed the test, and the passed disc is packaged.

A marginal disc according to an embodiment of the present invention is manufactured so as to account for defect factors, as shown in Table 2, by changing conditions of the above operations, for example, the operations 115 and 120. For instance, a track pitch of a normal disc is within a range of (1.6±0.1) μm while the marginal disc is manufactured so that the track pitch is within a range of (1.35±0.3) μm by adjusting a track pitch setting value when manufacturing the stamper of the marginal disc. The push-pull of the marginal disc is adjusted to be within a range of 0.02±0.005 by adjusting a thickness of the photoresist and a width of the pits.

The symmetry of the marginal disc is set to be within a range of −20±5 by using a method of cutting the photoresist when manufacturing the stamper.

On the other hand, the eccentricity of the marginal disc is set to 50 μm by deviating a centroid from a center when cutting an inner hole after the stamper is manufactured. For reference, the symmetry of a normal disc is within a range of −10±10, and the eccentricity is 50 μm or less, in case of a data CD, while in case of an audio CD, the eccentricity is 70 μm or less.

When injection-molding a substrate of the marginal disc, an injection temperature is adjusted to be within a range of 60–80° C. so that the birefringence of the marginal disc is within a range of 100–150 nm. For example, a low birefringence, which is set where the injection-molding is performed at a temperature of 80° C., becomes a high birefringence where the injection-molding is performed at a temperature of 68° C. Also, a difference between temperatures of a fixed shaft and a movable shaft of a mold is adjusted in the injection-molding so as to have the tilting of the marginal disc be 0.5 degree or more. The thickness of the reflective layer is adjusted during a sputtering of the reflective layer so as to adjust the reflectivity of the marginal disc within a range of 40–70%.

First through twelfth types of discs are manufactured by setting at least one of the reflectivity, the birefringence, and the tilting of the defect items to be within a corresponding range of the marginal disc. Here, discs are manufactured by manufacturing the stamper so as to have the track pitch within a range of 1.35±0.3 μm, the push-pull within a range of 0.02±0.005, the symmetry within a range of −20±5%, and the eccentricity within a range of 70±15 μm, and by changing injection conditions in the injection molding as shown in Table 3 below.

TABLE 3

| Disc ID | Stamper Spec | Injection Conditions | | | Number of Discs |
| | | Reflectivity (%) | Birefringence | Tilting (deg) | |
| --- | --- | --- | --- | --- | --- |
| First Type | Track Pitch; | 45 ± 3 | 0 ± 50 | 0.0 ± 0.2 | 300 |
| Second Type | 1.35 ± 0.3 μm | 45 ± 3 | 0 ± 50 | 0.5 ± 0.2 | 300 |
| Third Type | Push-pull; | 45 ± 3 | 150 ± 30 | 0.0 ± 0.2 | 300 |
| Fourth Type | 0.02 ± 0.005 | 45 ± 3 | 150 ± 30 | 0.5 ± 0.2 | 300 |
| Fifth Type | Symmetry: | 52 ± 3 | 0 ± 50 | 0.0 ± 0.2 | 300 |
| Sixth Type | −20 ± 5% | 52 ± 3 | 0 ± 50 | 0.5 ± 0.2 | 300 |
| Seventh Type | Eccentricity: | 52 ± 3 | 150 ± 30 | 0.0 ± 0.2 | 300 |
| Eighth Type | 70 ± 15μ | 52 ± 3 | 150 ± 30 | 0.5 ± 0.2 | 300 |
| Ninth Type | | 60 ± 3 | 0 ± 50 | 0.0 ± 0.2 | 300 |
| Tenth Type | | 60 ± 3 | 0 ± 50 | 0.5 ± 0.2 | 300 |
| Eleventh Type | | 60 ± 3 | 150 ± 30 | 0.0 ± 0.2 | 300 |
| Twelfth Type | | 60 ± 3 | 150 ± 30 | 0.5 ± 0.2 | 300 |

The birefringence and tilting were measured after manufacturing the first through twelfth discs satisfying the conditions in Table 3. For example, FIGS. 2A through 2D show the birefringence and tilting with respect to radiuses of 300 of the first type of marginal disc in Table 3. Also, the birefringence and tilting with respect to radiuses of 300 of the second through twelfth types of marginal discs are shown in FIGS. 3A through 13D.

Table 4 below shows conditions of marginal discs actually manufactured according to a disc manufacturing method of the present invention so as to improve the performance of the ODD.

TABLE 4

| Disc ID | Stamper | Reflectivity (%) | Birefringence nm | Tilting (deg) | Others |
|---|---|---|---|---|---|
| Zeroth Type | Track Pitch; | 69 | 40 | 0.08 | Normal |
| First Type | 1.35 μm | 44 | 26 | 0.05 | |
| Second Type | Push-pull; | 45 | 6 | 0.25 | |
| Third Type | 0.02 ± 0.005 | 45 | 167 | 0.08 | |
| Fourth Type | Symmetry; | 47 | 167 | 0.09 | |
| Fifth Type | −20 | 52 | 39 | 0.07 | |
| Sixth Type | | 53 | 15 | 0.47 | |
| Seventh Type | | 53 | 167 | 0.04 | |
| Eighth Type | | 55 | 167 | 0.11 | |
| Ninth Type | | 58 | 24 | 0.10 | |
| Tenth Type | | 58 | 20 | 0.26 | |
| Eleventh Type | | 62 | 166 | 0.02 | |
| Twelfth Type | | 62 | 162 | 0.08 | |

In Table 4, the reflectivity, birefringence, and tilting of the zeroth type of disc are normal. The first through twelfth type of discs are the marginal discs according to the present invention. The marginal discs of the present invention can be manufactured by accounting for defect factors according to the standard specification thereof.

Changes are needed to an ODD to improve the reproducing capacity of the ODD using the marginal discs. For example, the reproducing capacity of the ODD can be improved by considering a gain in a frequency bandwidth of a servo necessary to focus and track operations of the marginal disc. Also, a reproducing of data from the disc is performed by designing the disc using a sever compensation algorithm necessary for a reproduction speed factor suitable for the frequency bandwidth. For example, in a home ODD group, the reproducing capacity of the ODD with respect to a test disc is improved at a basic speed factor based on a servo compensation algorithm. However, in a PC-type ODD group, a technique to control vibrations and vary the eccentricity with a high speed factor is needed to improve the reproducing capacity of the ODD at the high speed factor.

In a disc and a manufacturing method thereof according to the present invention, a disc manufacturer quantifies defect factors of a disc that occur most frequently, for example, due to a dye change or a worn-out stamper, during a repetitive manufacturing process through statistical analyses, and then manufactures marginal discs by accounting for the defect factors in, for example, a stamper manufacturing process, an injection molding process, and a process of coating a reflective layer and a protective layer. As a result, the capacity of an ODD, to normally use the marginal discs accounting for the defect factors, can be improved.

Since the acquisition and manufacture of the marginal discs which account for the defect factors are possible, the influence of the defect factors can be continuously limited. Thus, a predetermined quality of discs can be used in the ODD.

Furthermore, since a mixture of the defect factors can be applied to a sheet of a marginal disc, a reproduction analysis of defective discs is possible by using only a sheet of the marginal disc where ODDs are manufactured. Thus, an inspection efficiency can be maximized. Moreover, this can improve the capacity of ODDs using defective discs and the efficiency of ODDs when reproducing data from the defective discs.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disc which improves a performance of an optical disc drive, the disc having a reflectivity within a range of 45–70%, a birefringence within a range of 100–150 nm, and a symmetry within a range of −20±5%.

2. The disc of claim 1, wherein the disc has a track pitch within a range of 1.35±0.3 μm.

3. The disc of claim 2, wherein the disc has a push-pull within a range of 0.02±0.005 signal.

4. The disc of claim 3, wherein the disc has a tilting greater than 0.5 degrees.

5. The disc of claim 1, wherein the disc has a push-pull within a range of 0.02±0.005 signal.

6. The disc of claim 1, wherein the disc has a tilting greater than 0.5 degrees.

7. The disc of claim 1, wherein the disc has a track pitch within a range of 1.35±0.3 μm.

8. The disc of claim 1, wherein the disc has a push-pull within a range of 0.02±0.005 signal.

9. The disc of claim 1, wherein the disc has a tilting greater than 0.5 degrees.

10. A method of manufacturing a disc to improve a performance of an optical disc drive, the method comprising:

manufacturing a glass master including forming pits by depositing a photoresist and developing the photoresist on a master, and depositing Ni on the completely developed master;

manufacturing a stamper by plating a surface of the glass master with Ni;

injection-molding a transparent substrate at an injection temperature of 68–80° C. by attaching the stamper to a mold;

coating a surface of the transparent substrate, on which marks of the transparent substrate are formed, with a reflective layer, wherein the coating of the surface includes adjusting a thickness of the reflective layer so as to have a reflectivity of the disc within a range of 45–70%; and coating the reflective layer with a protective layer.

11. The method of claim 10, wherein the manufacturing of the stamper includes adjusting a track pitch setting value so as to have a track pitch of the disc within a range of 1.35±0.3 μm.

12. The method of claim 11, wherein the disc has a symmetry within a range of −20±5%.

13. The method of claim 12, wherein the method includes adjusting a thickness of the photoresist and a width of the pits so as to have a push-pull of the disc within a range of 0.02±0.005 signal.

14. The method of claim 13, wherein the injection-molding of the transparent substrate includes adjusting a difference between temperatures of a fixed shaft and a moveable shaft of the mold so as to have a tilting of the disc be 0.5 degrees or more.

15. The method of claim 10, wherein the disc has a symmetry within a range of −20±5%.

16. The method of claim 15, wherein the method includes adjusting a thickness of the photoresist and a width of the pits so as to have a push-pull of the disc within a range of 0.02±0.005 nm.

17. The disc of claim 1, wherein the disc has an eccentricity of 50 μm.

18. The method of claim 10, wherein the injection temperature is adjusted to be within the 68–80° C. so as to have a birefringence of the disc within a range of 100–150 nm.

19. The method of claim 10, wherein the manufacturing of the stamper includes deviating a centroid from a center of an inner hole of the stamper so as to have an eccentricity of the disc be 50 μm.

20. A method of producing a disc which improves a performance of an optical disc driver, the method comprising:

qualifying defect factors affecting the optical disc driver in a manufacturing operation of the disc, the defect factors including a track pitch, a push pull, an eccentricity, a symmetry, reflectivity, a birefringence, and a tilting of the disc; and producing the disc accounting for the defect factors so as to limit an influence of the defect factors and provide a predetermined quality of the disc, wherein the manufacturing operation of the disc includes:
    manufacturing a stamper of the disc;
    iniection-molding the disc having pits using the stamper; and
    coating a surface on which the pits are formed with a reflective layer, the iniection-molding of the disc includes performing the injection-molding at an injection temperature of 68–80° C. so as to have a birefringence of the disc within a range of 100–150 nm, and the coating of the surface includes adiusting a thickness of the reflective layer so as to have a reflectivity of the disc within a range of 45–70%.

* * * * *

UNITED STATES PATENT AND TRADEMARK OFFICE
CERTIFICATE OF CORRECTION

PATENT NO. : 7,082,097 B2
APPLICATION NO. : 10/374718
DATED : July 25, 2006
INVENTOR(S) : Jong-tae An Page 1 of 1

It is certified that error appears in the above-identified patent and that said Letters Patent is hereby corrected as shown below:

Column 8, Line 59, change "of45-70%;" to --of 45-70%;--.

Column 10, Line 3, change "push pull," to --push-pull--.

Column 10, Line 12, change "iniection-molding" to --injection-molding--.

Column 10, Line 17, change "iniection-molding" to --injection-molding--.

Column 10, line 21, change "adiusting" to --adjusting--.

Signed and Sealed this

Nineteenth Day of December, 2006

JON W. DUDAS
*Director of the United States Patent and Trademark Office*